us011884401B2

(12) United States Patent  
Bradshaw et al.

(10) Patent No.: US 11,884,401 B2  
(45) Date of Patent: Jan. 30, 2024

(54) LAVATORY SYSTEMS HAVING CONTAINMENT COMPARTMENTS

(71) Applicant: THE BOEING COMPANY, Chicago, IL (US)

(72) Inventors: Karen Cavalier Bradshaw, Lynnwood, WA (US); Raymond Roeder, Everett, WA (US); Gretchen Humburg, Kirkland, WA (US)

(73) Assignee: The Boeing Company, Chicago, IL (US)

( * ) Notice: Subject to any disclaimer, the term of this patent is extended or adjusted under 35 U.S.C. 154(b) by 68 days.

(21) Appl. No.: 17/541,429

(22) Filed: Dec. 3, 2021

(65) Prior Publication Data

US 2022/0212801 A1 Jul. 7, 2022

Related U.S. Application Data

(60) Provisional application No. 63/133,308, filed on Jan. 2, 2021, provisional application No. 63/133,309, filed on Jan. 2, 2021, provisional application No. 63/133,310, filed on Jan. 2, 2021.

(51) Int. Cl.  
*B64D 11/02* (2006.01)

(52) U.S. Cl.  
CPC .................... *B64D 11/02* (2013.01)

(58) Field of Classification Search  
CPC ...................................................... B64B 11/02  
See application file for complete search history.

(56) References Cited

U.S. PATENT DOCUMENTS

| 9,862,490 B2 | 1/2018 | Airbus |
| 2013/0206907 A1* | 8/2013 | Burrows ............... B64D 11/02 244/118.5 |
| 2014/0224930 A1 | 8/2014 | Ivester |

(Continued)

FOREIGN PATENT DOCUMENTS

| CN | 105452103 | 3/2016 |
| EP | 0850833 | 7/1998 |

(Continued)

OTHER PUBLICATIONS

Extended European Search Report for EP 21216984.1-1004, dated May 2, 2022.  
Communication re EP 21216984.1-1004, dated Nov. 10, 2023.

*Primary Examiner* — J C Jacyna  
(74) *Attorney, Agent, or Firm* — Joseph M. Butscher; The Small Patent Law Group LLC

(57) ABSTRACT

A lavatory system within an internal cabin of a vehicle includes an enclosure defining an interior chamber, a first lavatory unit within the interior chamber, and a second lavatory within the interior chamber. The first lavatory unit is adjacent to the second lavatory unit. In at least one embodiment, a lavatory within an internal cabin of a vehicle includes an interior chamber defined by one or more outer walls, and a storage compartment extending outwardly from at least one of outer walls. The storage compartment defines an internal storage space that connects to the interior chamber. In at least one embodiment, a lavatory includes a first lavatory unit, a second lavatory adjacent to the first lavatory unit, and a containment compartment common to the first lavatory unit and the second lavatory unit.

19 Claims, 16 Drawing Sheets

(56) References Cited

U.S. PATENT DOCUMENTS

| | | | |
|---|---|---|---|
| 2014/0360099 A1 | 12/2014 | McIntosh | |
| 2015/0298809 A1* | 10/2015 | Minegishi | B64D 11/02 |
| | | | 244/118.5 |
| 2016/0009395 A1 | 1/2016 | Savian | |
| 2018/0251222 A1 | 9/2018 | Banfield | |
| 2019/0127068 A1* | 5/2019 | Scoley | B64D 11/02 |
| 2019/0375585 A1* | 12/2019 | Young | B65F 1/08 |
| 2020/0180767 A1* | 6/2020 | Koyama | B65F 1/1607 |

FOREIGN PATENT DOCUMENTS

| | | |
|---|---|---|
| WO | WO 2004/076279 | 9/2004 |
| WO | WO 2020/092325 | 5/2020 |

\* cited by examiner

LAVATORY SYSTEMS HAVING CONTAINMENT COMPARTMENTS

CROSS-REFERENCE TO RELATED APPLICATIONS

This application relates to and claims priority benefits from U.S. Provisional Patent Application No. 63/133,308, entitled "Lavatory Systems Within an Internal Cabin of a Vehicle," filed Jan. 2, 2021, which is hereby incorporated by reference in its entirety.

This application also relates to and claims priority benefits from U.S. Provisional Patent Application No. 63/133,309, entitled "Lavatory Systems Having Storage Compartments," filed Jan. 2, 2021, which is hereby incorporated by reference in its entirety.

This application also relates to and claims priority benefits from U.S. Provisional Patent Application No. 63/133,310, entitled "Lavatory Systems Having Containment Compartments," filed Jan. 2, 2021, which is hereby incorporated by reference in its entirety.

FIELD OF THE DISCLOSURE

Embodiments of the present disclosure generally relate to lavatories within an internal cabin of a vehicle, such as a commercial aircraft.

BACKGROUND OF THE DISCLOSURE

Commercial aircraft are used to transport passengers between various locations. A typical commercial aircraft includes one or more lavatories within an internal cabin.

Space within a commercial aircraft is limited. Notably, a lavatory within a commercial aircraft is typically relatively small in order to reduce space of the lavatory and increase space for other areas, such as passenger seating. A larger lavatory would necessarily occupy more space within a commercial aircraft, and may prevent additional passenger seating within an internal cabin. Aircraft operators typically prefer to have additional passenger seating within an internal cabin, as the additional passenger seating leads to increased revenues.

A typical lavatory within an internal cabin of an aircraft typically occupies approximately 20%-30% more longitudinal area (that is, an area that extends along and/or parallel to a longitudinal axis) of the internal cabin than a seat assembly. In general, current lavatories generally displace six to twelve passenger seats. Certain internal cabins may be rearranged to ensure only six displaced passenger seats, but thereby cause cascading impacts to surrounding interior features, such as other monuments or areas within the internal cabin. Overall, including lavatories within an internal cabin of a commercial aircraft, while typically necessary, reduces space for other components, monuments, or the like within the internal cabin, such as revenue-generating seats.

Further, persons of reduced mobility (such as individuals having disabilities, injuries, or a reduced ability to move) may find the confined space of a lavatory within a commercial aircraft relatively difficult to maneuver therein. Such individuals may have difficulty moving within the lavatory, such as between an entrance and a toilet, and between a toilet and a sink.

Accordingly, certain manufacturers have designed larger lavatories that are specifically designed for persons of reduced mobility. However, in expanding the size of the lavatory, space for other components (such as passenger seating) within an internal cabin is necessarily reduced.

SUMMARY OF THE DISCLOSURE

A need exists for a lavatory system including multiple lavatory units that occupy less space than known lavatories within an internal cabin of a vehicle. A need exists for a lavatory system including multiple lavatory units that occupy less space than an equivalent number of individual lavatories. Further, a need exists for a lavatory system that is readily and easily accessible by persons of limited mobility. Also, a need exists for a multi-unit lavatory system that does not reduce space for additional seating within an internal cabin of a vehicle.

With those needs in mind, certain embodiments of the present disclosure provide a lavatory system within an internal cabin of a vehicle. The lavatory system includes an enclosure defining an interior chamber, a first lavatory unit within the interior chamber, and a second lavatory within the interior chamber. The first lavatory unit is adjacent to the second lavatory unit. In at least one embodiment, the enclosure is a single monument within the internal cabin. As an example, the first lavatory unit and the second lavatory unit are side-to-side across a portion of the internal cabin. As an example, the first lavatory unit is inboard from the second lavatory unit within the internal cabin, and the second lavatory unit is outboard from the first lavatory unit within the internal cabin.

In at least one embodiment, the enclosure includes a first end wall. An inboard wall is connected to the first end wall. The inboard wall faces an aisle of the internal cabin. A second end wall is connected to the inboard wall. The second end wall is opposite from the first end wall. The second end wall faces an egress path of the internal cabin. An outboard wall is connected to the first end wall and the second end wall.

In at least one embodiment, the second end wall includes a first wall segment that is parallel to the first end wall and perpendicular to the inboard wall. An angled wall segment angles toward the first end wall and the outboard wall. A transition wall segment is connected to the angled wall segment. The transition wall segment is parallel to the inboard wall and the outboard wall. A second end wall segment is connected to the transition wall and the outboard wall. The second end wall segment is parallel to the first end wall. In at least one embodiment, the outboard wall is a portion of an outboard wall of the internal cabin.

In at least one embodiment, the first lavatory unit includes a first passage that connects to an aisle of the internal cabin. A first door is configured to open and close the first passage. The second lavatory unit includes a second passage that connects to an egress path of the internal cabin. A second door is configured to open and close the second passage.

In at least one embodiment, the first lavatory unit has a first length and the second lavatory unit has a second length. The first length is greater than the second length.

In at least one embodiment, the lavatory system also includes a divider wall within the interior chamber. The divider wall separates the first lavatory unit from the second lavatory unit. In at least one example, the divider wall is movable between a closed position that separates the interior chamber into the first lavatory unit and the second lavatory unit, and an open position, in which the interior chamber provides an enlarged, expanded single lavatory space.

The first lavatory unit includes a first sink and a first toilet and/or urinal. The second lavatory unit includes a second sink and a second toilet.

In an example, the lavatory system also includes a barrier movably coupled to one of the first lavatory unit or the second lavatory unit. The barrier is movable between an extended position and a retracted position. The barrier in the extended position is disposed in front of an exit door of the vehicle. The exit door is visible within the internal cabin when the barrier is in the retracted position. The barrier may include a handle that is configured to be grasped to move the barrier between the extended position and the retracted position. The barrier may include a sign that indicates a location of one or both of the first lavatory unit or the second lavatory unit.

In at least one embodiment, the lavatory system also includes a storage compartment extending outwardly from an outer wall of one or both of the first lavatory unit or the second lavatory unit. The storage compartment defines an internal storage space that connects to the interior chamber. For example, the storage compartment is at least a portion of a stowage bin assembly. As another example, the storage compartment is at least a portion of an end cap connected to a stowage bin assembly.

A storage access door may be disposed between the storage compartment and the interior chamber. The storage access door is configured to be moved between an open position and a closed position. The internal storage space is opened to the interior chamber when the storage access door is in the open position. The internal storage space is closed to the interior chamber when the storage access door is in the closed position. In at least one embodiment, the storage compartment is directly connected to the interior chamber, but is not within the interior chamber.

An access opening connects the internal storage space to the interior chamber. The access opening may be formed through the outer wall.

The storage compartment may include a lighting assembly within the internal storage space. For example, the lighting assembly is operatively coupled to a storage access door of the storage compartment. The lighting assembly is configured to activate to illuminate the interior storage space when the storage access door is opened. The lighting assembly is configured to be deactivated when the storage access door is closed.

In at least one embodiment, the lavatory system also includes a containment compartment common to the first lavatory unit and the second lavatory unit. For example, the containment compartment extends through a divider wall that separates the first lavatory unit from the second lavatory unit.

In at least one embodiment, the containment compartment includes a first interior end wall within the first lavatory unit, a front wall, a rear wall, a base, an upper counter, and a second interior end wall opposite from the first interior end wall. The second interior end wall is within the second lavatory unit. The first interior end wall, the front wall, the rear wall, the base, the upper counter, and the second interior end wall define a containment chamber of the containment compartment. A trash container may be stored within the containment compartment.

In at least one embodiment, the containment compartment also includes an access door within one of the first lavatory unit or the second lavatory unit. The access door is movable between an open position and a closed position. The containment compartment is exposed when the access door is in the open position. The containment compartment is closed when the access door is in the closed position.

In at least one embodiment, the lavatory system also includes a first trash opening in the first lavatory unit. The first trash opening leads to a containment chamber of the containment compartment. A second trash opening is in the second lavatory unit. The second trash opening leads to the containment chamber of the containment compartment. As a further example, a first trash duct is connected to the first trash opening, and a second trash duct is connected to the second trash opening.

Certain embodiments of the present disclosure provide a method of forming a lavatory system within an internal cabin of a vehicle. The method includes providing an enclosure defining an interior chamber, forming a first lavatory unit within the interior chamber, and forming a second lavatory within the interior chamber. The first lavatory unit is adjacent to the second lavatory unit.

Certain embodiments of the present disclosure provide a vehicle including an internal cabin having an aisle and an egress path, and a lavatory system within the internal cabin, as described herein.

Certain embodiments of the present disclosure provide a lavatory within an internal cabin of a vehicle. The lavatory includes an interior chamber defined by one or more outer walls, and a storage compartment extending outwardly from at least one of outer walls. The storage compartment defines an internal storage space that connects to the interior chamber. The lavatory may be at least one lavatory unit of a lavatory system.

As an example, the storage compartment is at least a portion of a stowage bin assembly. As another example, the storage compartment is at least a portion of an end cap connected to a stowage bin assembly.

The lavatory may also include a storage access door disposed between the storage compartment and the interior chamber. The storage access door is configured to be moved between an open position and a closed position. The internal storage space is opened to the interior chamber when the storage access door is in the open position. The internal storage space is closed to the interior chamber when the storage access door is in the closed position.

In at least one embodiment, the storage compartment is directly connected to the interior chamber, but is not within the interior chamber.

As an example, an access opening connects the internal storage space to the interior chamber. The access opening is formed through the one or more outer walls.

The storage compartment may include a lighting assembly within the internal storage space. The lighting assembly is operatively coupled to a storage access door of the storage compartment. For example, the lighting assembly is configured to activate to illuminate the interior storage space when the storage access door is opened. The lighting assembly is configured to be deactivated when the storage access door is closed.

Certain embodiments of the present disclosure provide a method of forming a lavatory within an internal cabin of a vehicle. The method includes defining an interior chamber of the lavatory by one or more outer walls, extending a storage compartment outwardly from at least one of the outer walls, and connecting an internal storage space of the storage compartment to the interior chamber.

Certain embodiments of the present disclosure provide a vehicle including an internal cabin, and a lavatory within an internal cabin of a vehicle, as described herein.

Certain embodiments of the present disclosure provide a lavatory system within an internal cabin of a vehicle. The lavatory system includes a first lavatory unit, a second lavatory adjacent to the first lavatory unit, and a containment compartment common to the first lavatory unit and the second lavatory unit.

In at least one embodiment, the containment compartment extends through a divider wall that separates the first lavatory unit from the second lavatory unit.

As an example, the containment compartment includes a first interior end wall within the first lavatory unit, a front wall, a rear wall, a base, an upper counter, and a second interior end wall opposite from the first interior end wall. The second interior end wall is within the second lavatory unit. The first interior end wall, the front wall, the rear wall, the base, the upper counter, and the second interior end wall define a containment chamber of the containment compartment. A trash container may be stored within the containment compartment.

In at least one embodiment, the containment compartment includes an access door within one of the first lavatory unit or the second lavatory unit. The access door is movable between an open position and a closed position. The containment compartment is exposed when the access door is in the open position. The containment compartment is closed when the access door is in the closed position.

In at least one embodiment, a first trash opening in the first lavatory unit. The first trash opening leads to a containment chamber of the containment compartment. A second trash opening is in the second lavatory unit. The second trash opening leads to the containment chamber of the containment compartment. As a further example, a first trash duct is connected to the first trash opening, and a second trash duct connected to the second trash opening.

Certain embodiments of the present disclosure provide a method of forming a lavatory system within an internal cabin of a vehicle. The method includes providing a containment compartment common to a first lavatory unit and a second lavatory unit that is adjacent to the first lavatory unit.

Certain embodiments of the present disclosure provide a vehicle including a containment compartment, as described herein.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition can include additional elements not having that condition.

Certain embodiments of the present disclosure provide a lavatory system including two lavatory units within a common enclosure, such as a single, common, monument. The lavatory units are arranged so as to displace only a single three seat assembly unit. In at least one embodiment, the lavatory system is located proximate to an end of a column of seats and an exit doorway. The lavatory system allows aircraft operators to have four lavatories (two lavatories per lavatory system) within an area, and at the same time retain as many as eighteen passenger seats, as compared to conventional lavatories within a commercial aircraft. As such, embodiments of the present disclosure provide lavatory systems that allow for aircraft operators to maintain or even increase revenue-generating passenger seats within an internal cabin.

Figure 1:
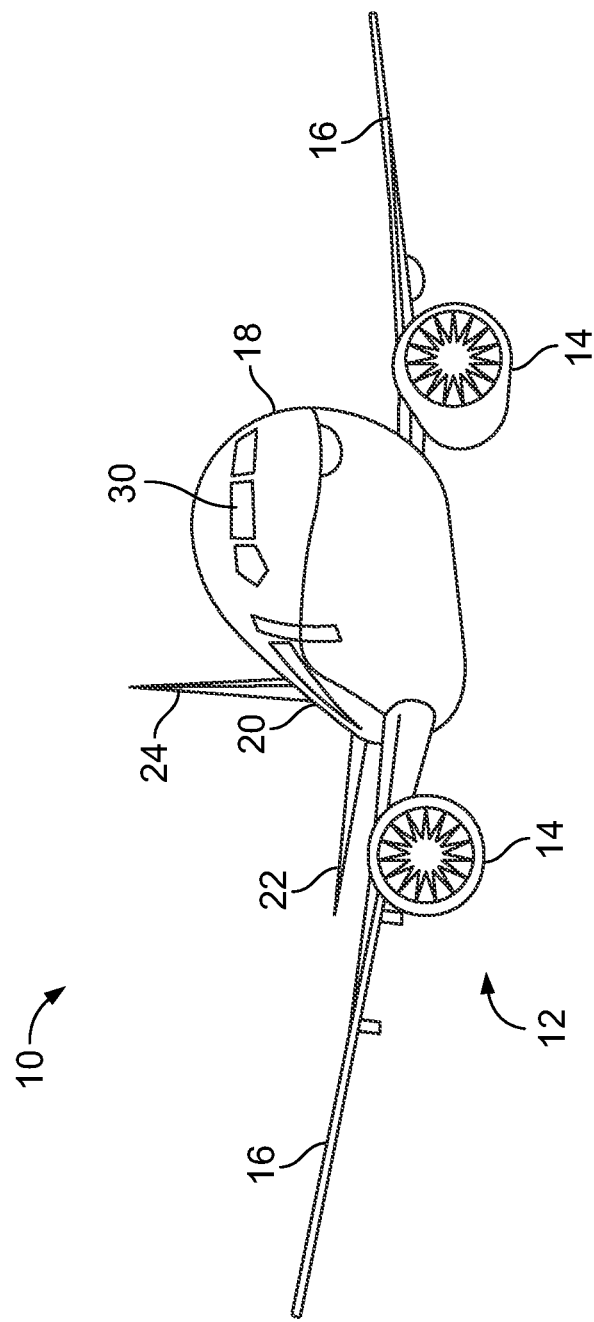
FIG. 1 illustrates a perspective front view of an aircraft, according to an embodiment of the present disclosure.

FIG. 1 illustrates a perspective front view of an aircraft 10, according to an embodiment of the present disclosure. The aircraft 10 includes a propulsion system 12 that includes engines 14, for example. Optionally, the propulsion system 12 may include more engines 14 than shown. The engines 14 are carried by wings 16 of the aircraft 10. In other embodiments, the engines 14 may be carried by a fuselage 18 and/or an empennage 20. The empennage 20 may also support horizontal stabilizers 22 and a vertical stabilizer 24.

The fuselage 18 of the aircraft 10 defines an internal cabin 30, which includes a flight deck or cockpit, one or more work sections (for example, galleys, personnel carry-on baggage areas, and the like), one or more passenger sections (for example, first class, business class, and coach sections), one or more lavatories, and/or the like. The internal cabin 30 includes one or more lavatory systems, lavatory units, or lavatories, as described herein.

Alternatively, instead of an aircraft, embodiments of the present disclosure may be used with various other vehicles, such as automobiles, buses, locomotives and train cars, watercraft, and the like. Further, embodiments of the present disclosure may be used with respect to fixed structures, such as commercial and residential buildings.

Figure 2A:
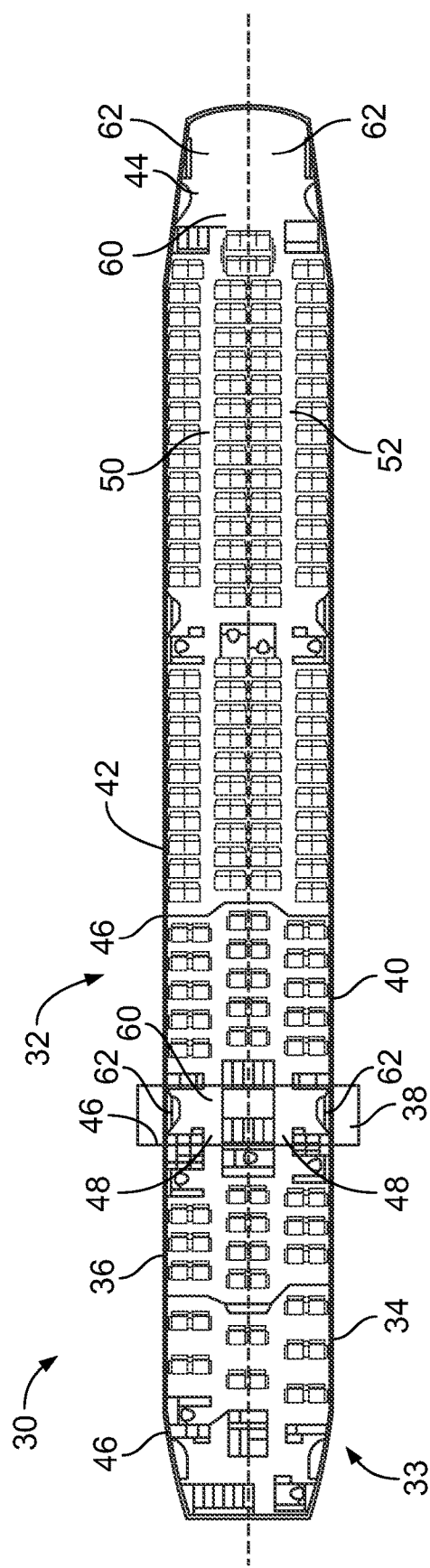
FIG. 2A illustrates a top plan view of an internal cabin of an aircraft, according to an embodiment of the present disclosure.

FIG. 2A illustrates a top plan view of an internal cabin 30 of an aircraft, according to an embodiment of the present disclosure. The internal cabin 30 may be within the fuselage 32 of the aircraft, such as the fuselage 18 of FIG. 1. For example, one or more fuselage walls may define the internal cabin 30. The internal cabin 30 includes multiple sections, including a front section 33, a first class section 34, a business class section 36, a front galley station 38, an expanded economy or coach section 40, a standard economy of coach section 42, and an aft section 44, which may include multiple lavatories and galley stations. It is to be understood that the internal cabin 30 may include more or less sections than shown. For example, the internal cabin 30 may not include a first class section, and may include more or less galley stations than shown. Each of the sections may be separated by a cabin transition area 46, which may include class divider assemblies between aisles 48.

As shown in FIG. 2A, the internal cabin 30 includes two aisles 50 and 52 that lead to the aft section 44. Optionally, the internal cabin 30 may have less or more aisles than shown. For example, the internal cabin 30 may include a single aisle that extends through the center of the internal cabin 30 that leads to the aft section 44.

The aisles 48, 50, and 52 extend to egress paths or door passageways 60. Exit doors 62 are located at ends of the egress paths 60. The egress paths 60 may be perpendicular to the aisles 48, 50, and 52. The internal cabin 30 may include more egress paths 60 at different locations than shown. As described herein, lavatory systems may be located at or proximate to intersections of the aisles 48, 50, 52 and the egress paths 60.

Figure 2B:
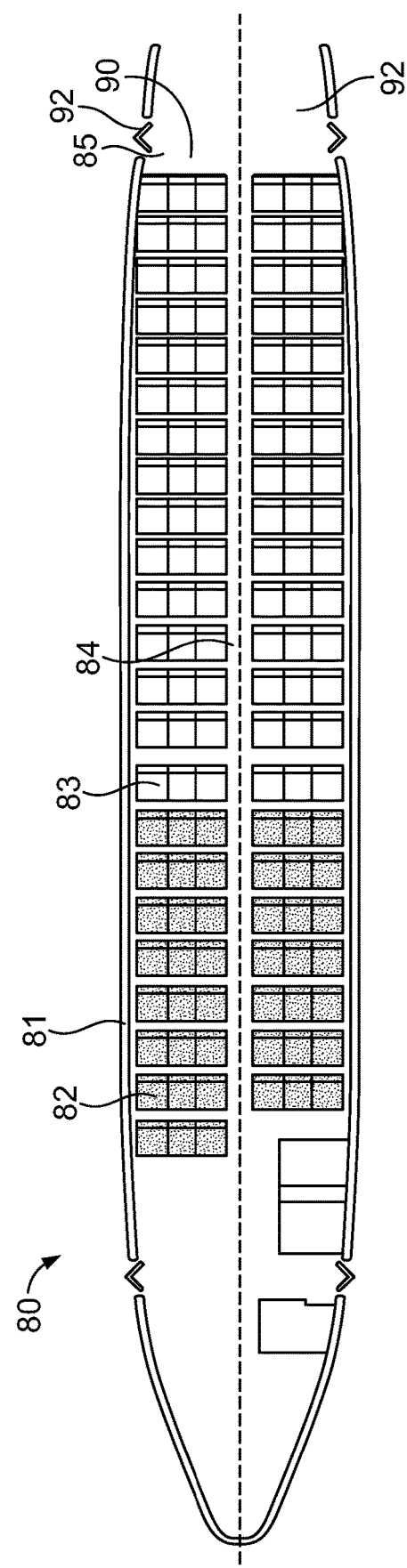
FIG. 2B illustrates a top plan view of an internal cabin of an aircraft, according to an embodiment of the present disclosure.

FIG. 2B illustrates a top plan view of an internal cabin 80 of an aircraft, according to an embodiment of the present disclosure. The internal cabin 80 is an example of the internal cabin 30 shown in FIG. 1. The internal cabin 80 may be within a fuselage 81 of the aircraft. For example, one or more fuselage walls may define the internal cabin 80. The internal cabin 80 includes multiple sections, including a main cabin 82 having passenger seats 83, and an aft section 85 behind the main cabin 82. It is to be understood that the internal cabin 80 may include more or less sections than shown.

The internal cabin 80 may include a single aisle 84 that leads to the aft section 85. The single aisle 84 may extend through the center of the internal cabin 80 that leads to the aft section 85. For example, the single aisle 84 may be coaxially aligned with a central longitudinal plane of the internal cabin 80.

The aisle 84 extends to an egress path or door passageway 90. Exit doors 92 are located at ends of the egress path 90. The egress path 90 may be perpendicular to the aisle 84. The internal cabin 80 may include more egress paths than shown. As described herein, lavatory systems may be located at or proximate to intersections of the aisle 84 and one or more egress paths 90.

Figure 3:
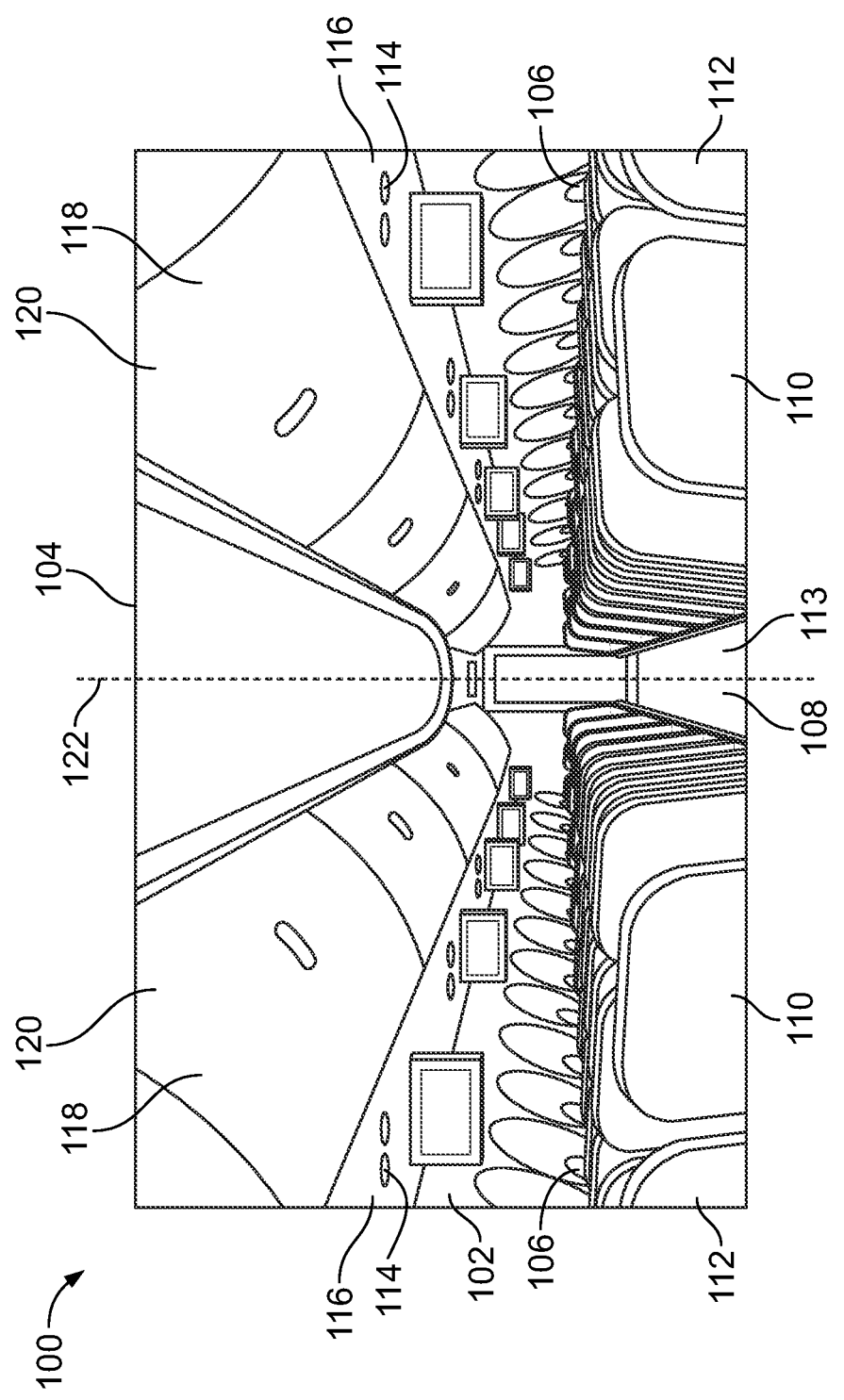
FIG. 3 illustrates a perspective interior view of an internal cabin of an aircraft, according to an embodiment of the present disclosure.

FIG. 3 illustrates a perspective interior view of an internal cabin 100 of an aircraft, according to an embodiment of the present disclosure. The internal cabin 100 is an example of the internal cabin 30, shown in FIG. 1. The internal cabin 100 includes outboard walls 102 connected to a ceiling 104. Windows 106 may be formed within the outboard walls 102. A floor 108 supports rows of seats 110. As shown in FIG. 3, a row 112 may include two seats 110 on either side of an aisle 113. However, the row 112 may include more or less seats 110 than shown. Additionally, the internal cabin 100 may include more aisles than shown.

Passenger service units (PSUs) 114 are secured between an outboard wall 102 and the ceiling 104 on either side of the aisle 113. The PSUs 114 extend between a front end and rear end of the internal cabin 100. For example, a PSU 114 may be positioned over each seat 110 within a row 112. Each PSU 114 may include a housing 116 that generally contains vents, reading lights, an oxygen bag drop panel, an attendant request button, and other such controls over each seat 110 (or groups of seats) within a row 112.

Overhead stowage bin assemblies 118 are secured to the ceiling 104 and/or the outboard wall 102 above and inboard from the PSU 114 on either side of the aisle 113. The overhead stowage bin assemblies 118 are secured over the seats 110. The overhead stowage bin assemblies 118 extend between the front and rear end of the internal cabin 100. Each stowage bin assembly 118 may include a pivot bin or bucket 120 pivotally secured to a strongback (hidden from view in FIG. 3). The overhead stowage bin assemblies 118 may be positioned above and inboard from lower surfaces of the PSUs 114. The overhead stowage bin assemblies 118 are configured to be pivoted open in order to receive passenger carry-on baggage and personal items, for example.

As used herein, the term "outboard" means a position that is further away from a central longitudinal plane 122 of the internal cabin 100 as compared to another component. The term "inboard" means a position that is closer to the central longitudinal plane 122 of the internal cabin 100 as compared to another component. For example, a lower surface of a PSU 114 may be outboard in relation to a stowage bin assembly 118.

Figure 4:
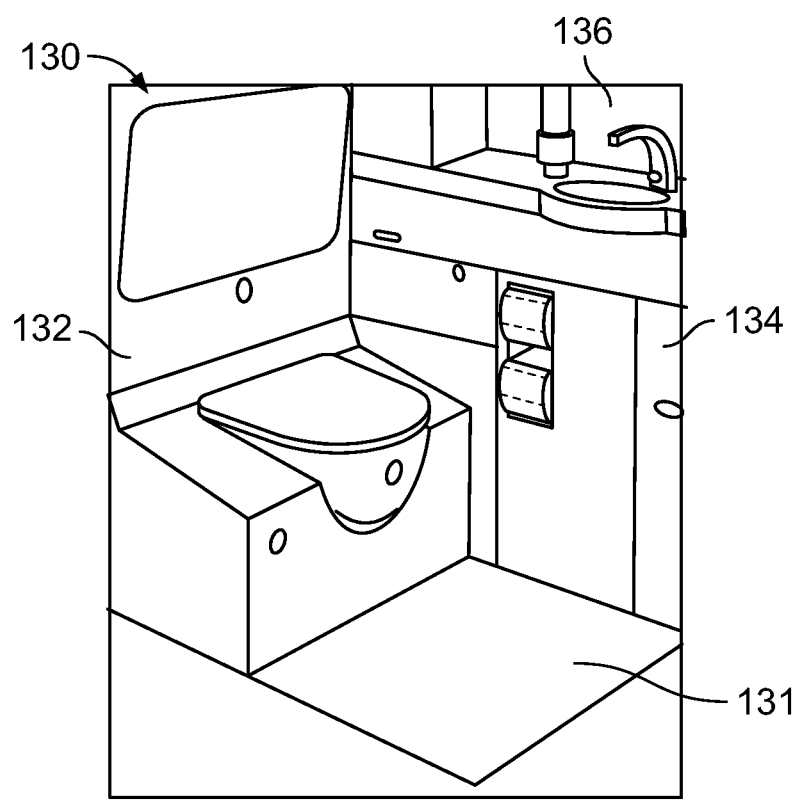
FIG. 4 illustrates a perspective internal view of a lavatory within an internal cabin of an aircraft.

FIG. 4 illustrates a perspective internal view of a lavatory 130 within an internal cabin of a vehicle, such as any of the internal cabins described herein. The lavatory 130 is an example of an enclosed space, monument or chamber, such as within the internal cabin of the aircraft 10, shown in FIG. 1. The lavatory 130 may be onboard an aircraft, as described above. Optionally, the lavatory 130 may be onboard various other vehicles. In other embodiments, the lavatory 130 may be within a fixed structure, such as a commercial or residential building. The lavatory 130 includes a base floor 131 that supports a toilet 132 (and/or a urinal), cabinets 134, and a sink 136 or wash basin. The lavatory 130 may be arranged differently than shown. The lavatory 130 may include more or less components than shown.

Figure 5:
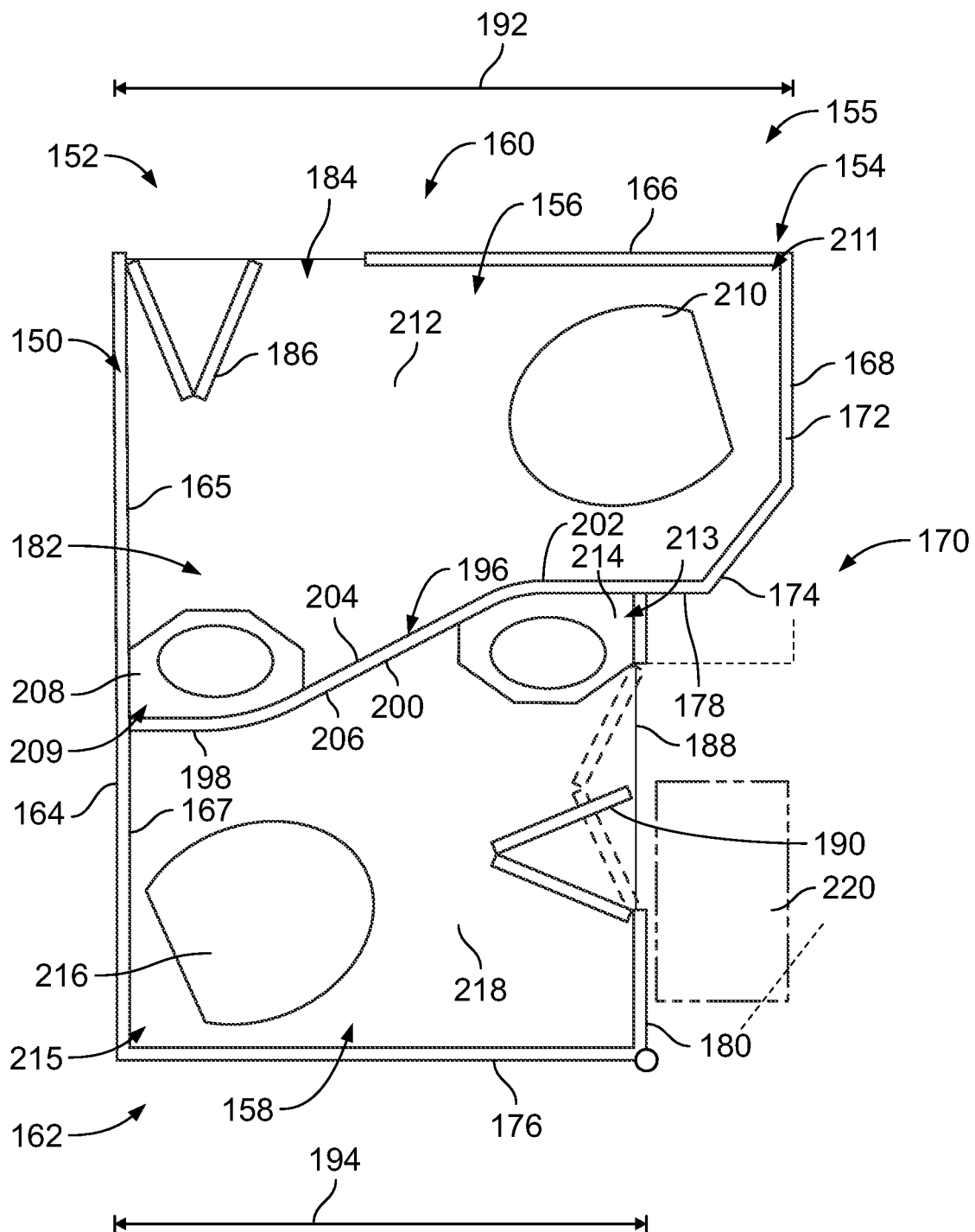
FIG. 5 illustrates a top view of a lavatory system within an internal cabin, according to an embodiment of the present disclosure.

FIG. 5 illustrates a top view of a lavatory system 150 within an internal cabin 152, according to an embodiment of the present disclosure. The lavatory system 150 may be used within any of the internal cabins described herein, such as the internal cabins shown and described with respect to FIGS. 1-3.

The lavatory system 150 includes a single enclosure 154 (such as a monument) that includes a first lavatory unit 156 adjacent to a second lavatory unit 158. That is, the lavatory system 150 is a single monument. The first lavatory unit 156 and the second lavatory unit 158 are disposed laterally across a portion of the internal cabin 152, instead of longitudinally along an aisle 160. That is, the first lavatory unit 156 and the second lavatory 158 are side-to-side across a portion of the internal cabin 152, instead of end-to-end along a length of the internal cabin 152. In this manner, the lavatory system 150 extends over a smaller longitudinal portion (such as one longitudinal area 162) of the internal cabin 152, instead of an extended longitudinal portion (for example, two longitudinal areas (such as if the first lavatory unit 156 and the second lavatory unit 158 were end-to-end)), thereby freeing up additional space for other components, such as another monument (such as a galley), or additional passenger seats (such as a three seat assembly), which generate revenue for an aircraft operator.

The lavatory system 150 provides two lavatory units, such as the first lavatory unit 156 and the second lavatory unit 158, while displacing only a single seating assembly having three passenger seats. The side-to-side configuration of the first and second lavatory units 156 and 158 provides multiple lavatory units while allowing for additional passenger seating, for example (in contrast to lavatories that are disposed end-to-end). In at least one embodiment, the lavatory system 150 provides multiple lavatory units within the space of a three seating unit passenger seating assembly.

The first lavatory unit 156 is an inboard lavatory unit, and the second lavatory unit 158 is an outboard lavatory unit. It is to be understood that the terms first and second are merely for labeling purposes. A first lavatory unit may be a second lavatory unit, and vice versa.

The single enclosure (such as a monument) 154 that defines the lavatory system 150 includes a first end wall 164 (or first system end wall) that connects to an inboard wall 166 (or system inboard wall) facing the aisle 160. The inboard wall 166 connects to a second end wall 168 (or second system end wall) opposite from the first end wall 164. The second end wall 168 faces an egress path 170 that connects to the aisle 160. In at least one embodiment, the second end wall 168 includes a first wall segment 172 that may be parallel to the first end wall 164 (and perpendicular to the inboard wall 166). The first wall segment 172 connects to an angled wall segment 174 that angles toward the first end wall 164 and an outboard wall 176 (or system outboard wall) that connects to the first end wall 164 and the second end wall 168. The angled wall segment 174, in turn, connects to a transition wall segment 176, which may be parallel to the inboard wall 166 and the outboard wall 178. The transition wall segment 178 connects to a second wall segment 180, which may be parallel to the first end wall 164 and perpendicular to the outboard wall 176. Optionally, the angled wall segment 174 may connect directly to the second wall segment 180 without the transition wall segment 178. The second wall segment 180 connects to the outboard wall 178.

In at least one embodiment, the outboard wall 176 is a portion of an outboard wall of the internal cabin 152, such as the outboard wall 102 shown in FIG. 3. That is, the outboard wall 102, in part, defines the internal cabin 152. Using a portion of the outboard wall of the internal cabin 152 to provide the outboard wall 176 provides increased interior space within the lavatory system 150. In at least one other embodiment, the outboard wall 176 is a separate wall that abuts against or is otherwise proximate to the outboard wall of the internal cabin 152.

The first end wall 164, the inboard wall 166, the second end wall 168 and the outboard wall 176 define the outer perimeter of the enclosure 154 (and the monument 155), and an interior chamber 182 of the lavatory system 150. That is, the enclosure 154 defines the interior chamber 182. The enclosure 154 is within the internal cabin 152. The enclosure 154 is not the internal cabin 152. For example, an internal cabin may include multiple lavatories. However, the internal cabin 152 includes the enclosure 154, which includes the first lavatory unit 156 and the second lavatory unit 158 within the interior chamber 182 of the enclosure 154 (in contrast to two distinct lavatories abutting one another). The enclosure 154 includes the first lavatory unit 156 and the second lavatory unit 158 within the interior chamber 182. The first lavatory unit 156 and the second lavatory unit 158 are within the interior chamber 182.

The first lavatory unit 156 includes a passage 184 that connects to the aisle 160. A door 186 is movably coupled to the first end wall 164 and/or the inboard wall 166. The door 186 faces the aisle 160 and is configured to be moved between a closed position, in which the passage 184 is closed to the aisle 160, and an open position, in which the passage 184 is open to the aisle 160. When the door 186 is in the open position, an individual may pass between the aisle 160 and the first lavatory unit 156 through the passage 184.

The second lavatory unit 158 includes a passage 188 that connects to the egress path 170. A door 190 is movably coupled to the second end wall 168 (such as the second wall segment 180, and/or the outboard wall 176. The door 190 faces the egress path 170 and is configured to be moved between a closed position, in which the passage 188 is closed to the egress path 170, and an open position, in which the passage 188 is open to the egress path 170. When the door 190 is in the open position, an individual may pass between the egress path 170 and the second lavatory unit 158 through the passage 188.

In at least one embodiment, a length 192 of the first lavatory unit 156 is greater than a length 194 of the second lavatory unit 158. For example, the first lavatory unit 156 may extend along a greater longitudinal length of the aisle 160 than the second lavatory unit 158. As such, the second wall segment 180 including the passage 188 of the second lavatory unit 158 may be recessed further toward the first end wall 164 as compared to the first wall segment 172.

A divider wall 196 is disposed within the interior chamber 182 and extends between the first end wall 164 and the second end wall 168. The divider wall 196 separates the first lavatory unit 156 from the second lavatory unit 158. The divider wall 196 may include a first divider segment 198 that may be perpendicular to the first end wall 174. The first divider segment 198 connects to an angled divider segment 200 that angles toward the inboard wall 166 and the first wall segment 172. The angled divider segment 200 connects to a second divider segment 202 that may be parallel to the first divider segment 198. The second divider segment 202 may connect to the transition wall segment 178 and/or another portion of the second end wall 168.

In at least one embodiment, the first lavatory unit 156 is defined between the inboard wall 166, the first wall segment 172, the angled wall segment 174, the transition wall segment 178, a first side 204 of the divider wall 196, and an inboard segment 165 (that is, the portion inboard from the divider wall 196) of the first end wall 164. The second lavatory unit 158 is defined between the outboard wall 176, an outboard segment 167 (that is, the portion outboard from the divider wall 196) of the first end wall 164, a second side 206 (opposite from the first side 204) of the divider wall 196, and the second wall segment 180 of the second end wall 168.

The first lavatory unit 156 includes a first sink 208 and a first toilet 210 with a first standing space 212 in front of the first toilet 210. The first sink 208 may be located at or proximate to a corner 209 defined by the first side 204 of the divider wall 196 and the inboard segment 165 of the first end wall 164. The first toilet 210 may be located at or proximate to a corner 211 defined by the inboard wall 166 and the second end wall 168. The term toilet as used herein includes one or both of standard toilet or a urinal.

The second lavatory unit 158 includes a second sink 214 and a second toilet 216 with a second standing space 218 in front of the second toilet 216. The second sink 214 may be located at or proximate to a corner 213 defined by the second side 206 of the divider wall 196 and the second wall segment 180 of the second end wall 168. The second toilet 216 may be located at or proximate to a corner 215 defined by the outboard wall 176 and the outboard segment 167 of the first end wall 164.

The configurations of the sinks and toilets of the first lavatory unit 156 and the second lavatory unit 158 shown in FIG. 5 are merely exemplary. The sinks and toilets may be located at various other areas than shown.

In at least one embodiment, a flight attendant assist space 220 is located in front of the second wall segment 180 of the second end wall 168, such as in front of the passage 188. The flight attendant assist space 220 may be proximate to an exit door at an end of the egress path 170. The flight attendant assist space 220 is an open area in which a flight attendant may stand to assist individuals entering and exiting the egress path 170. The second lavatory unit 158 is sized and configured to preserve a defined required area (such as a 12"×20" area) for the flight attendant assist space, such as may be required by a regulatory agency (for example, the United States Federal Aviation Administration). The angled wall segment 174 may provide an egress flow director that guides and directs individuals toward the exit door when leaving the internal cabin 152, and toward the aisle 160 when entering the internal cabin 152.

Figure 6:
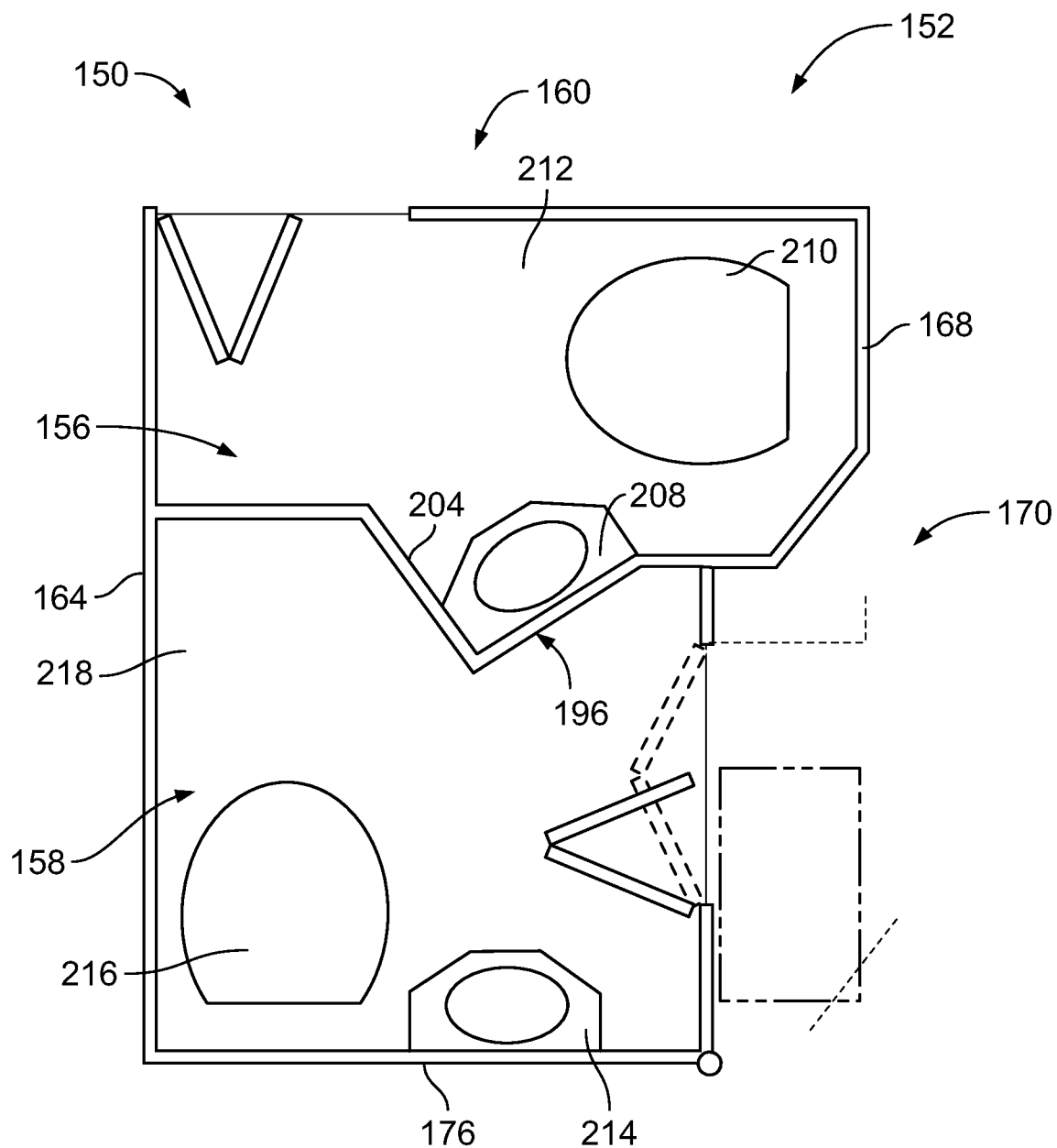
FIG. 6 illustrates a top view of a lavatory system within an internal cabin, according to an embodiment of the present disclosure.

FIG. 6 illustrates a top view of the lavatory system 150 within the internal cabin 152, according to an embodiment of the present disclosure. In this embodiment, the first sink 208 of the first lavatory unit 156 may be coupled to the first side 204 of the divider wall 196 at an intermediate location between the first end wall 164 and the second end wall 168, and the second sink 214 may be coupled to the outboard wall 176. The configurations of the sinks and toilets of the first lavatory unit 156 and the second lavatory unit 158 shown in FIG. 6 are merely exemplary. The sinks and toilets may be located at various other areas than shown.

Figure 7:
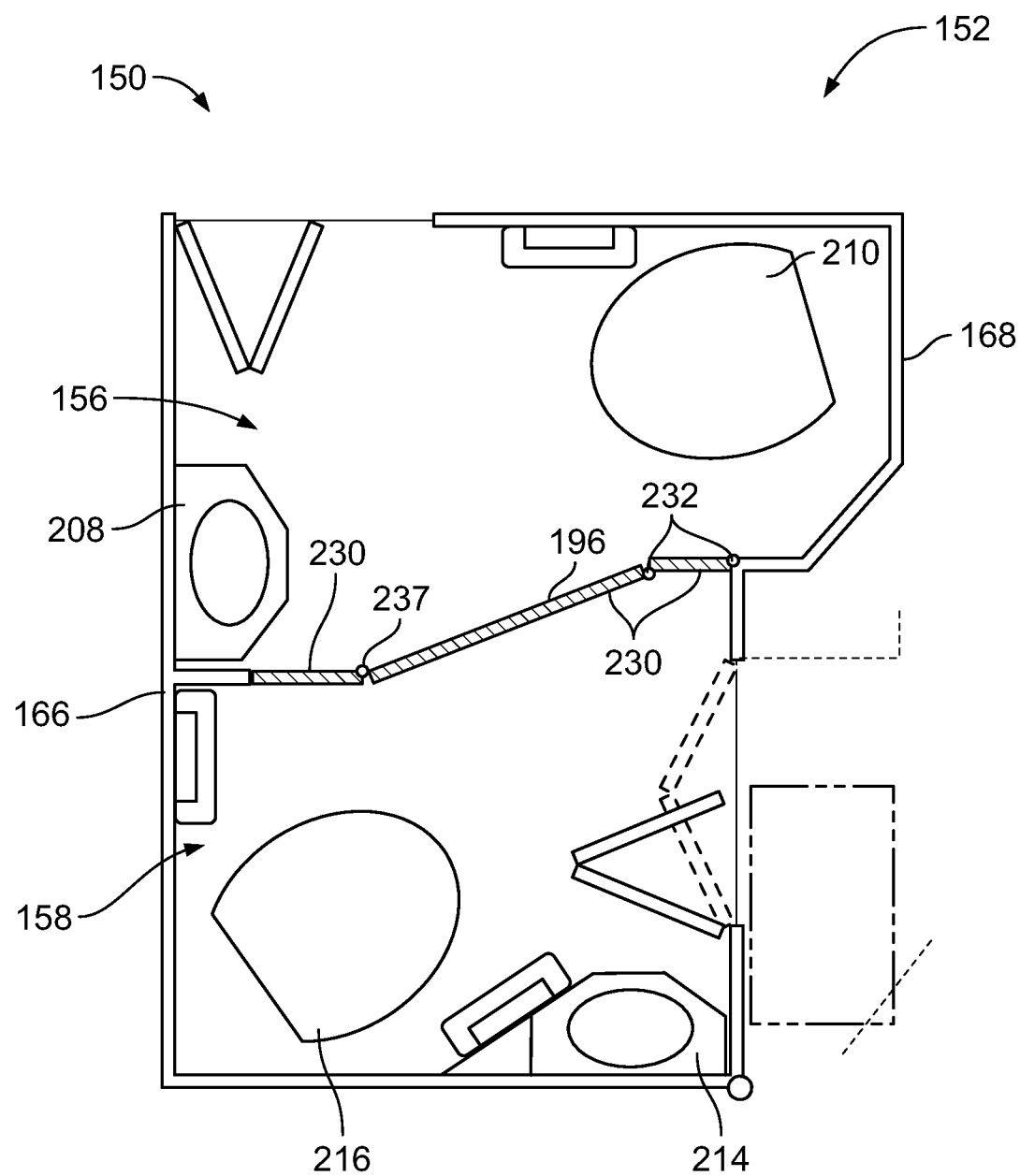
FIG. 7 illustrates a top view of a lavatory system within an internal cabin, according to an embodiment of the present disclosure.

FIG. 7 illustrates a top view of the lavatory system 150 within the internal cabin 152, according to an embodiment of the present disclosure. The lavatory system 150 shown in FIG. 7 is similar to that shown in FIG. 5, except that the divider wall 196 may be configured to be moved between a closed position, which separates the interior chamber 182 into the defined first lavatory unit 156 and the second lavatory unit 158, and an open position, in which the interior chamber 182 provides an enlarged, expanded single lavatory space, which is easily and comfortably accessible by persons of limited mobility. The first sink 208, the first toilet 210, the second sink 214, and the second toilet 216 may not be connected to movable portions of the divider wall 196. For example, the divider wall 196 may include a plurality of foldable segments 230 coupled together through hinges 232 that allow the divider wall 196 to be folded and disconnected from one or both of the first end wall 166 and the second end wall 168. In this manner, the divider wall 196 is foldable or otherwise collapsible. The divider wall 196 in the collapsed position may be secured against an interior wall, and/or removed and stored within the lavatory system 150 or another portion of the internal cabin 152. As another example, the divider wall 196 may be configured to telescope between open and closed positions. As another example, the divider wall 196 may be configured to slide between open and closed positions. As another example the divider wall 196 may be a curtain or drape, which may include sound-dampening elements. In short, the divider wall 196 may be a movable wall having segments that are configured to move in order to allow the divider wall 196 to be moved between open and closed positions.

Figure 8:
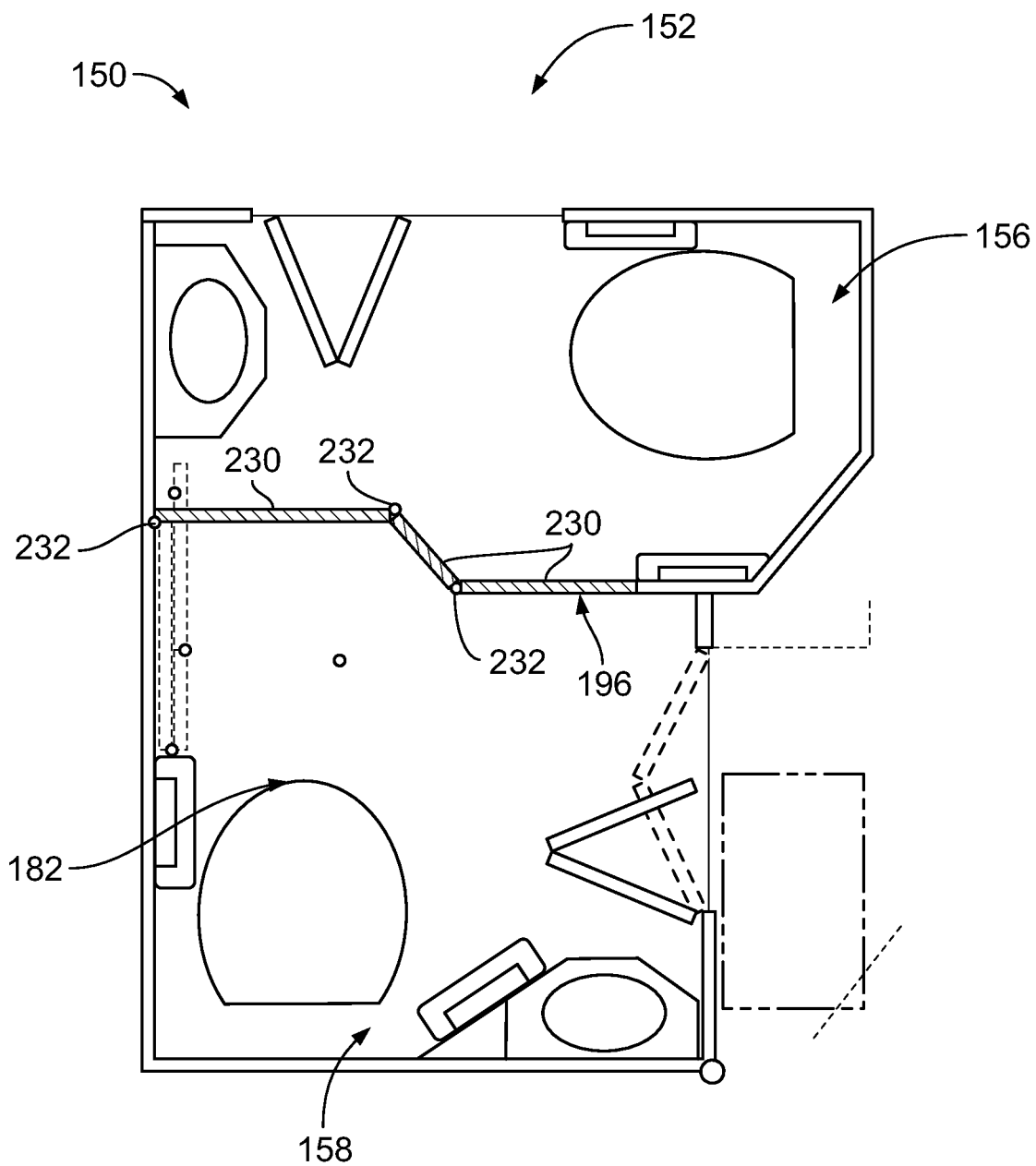
FIG. 8 illustrates a top view of a lavatory system within an internal cabin, according to an embodiment of the present disclosure.

FIG. 8 illustrates a top view of the lavatory system 150 within the internal cabin 152, according to an embodiment of the present disclosure. The lavatory system 150 shown in FIG. 8 is similar to that shown in FIG. 6, except that the divider wall 196 may be configured to be moved between a closed position, which separates the interior chamber 182 into the defined first lavatory unit 156 and the second lavatory unit 158, and an open position, in which the interior chamber 182 provides an enlarged, expanded single lavatory space, which is easily and comfortably accessible by persons of limited mobility, as described with respect to FIG. 7.

Figure 19:
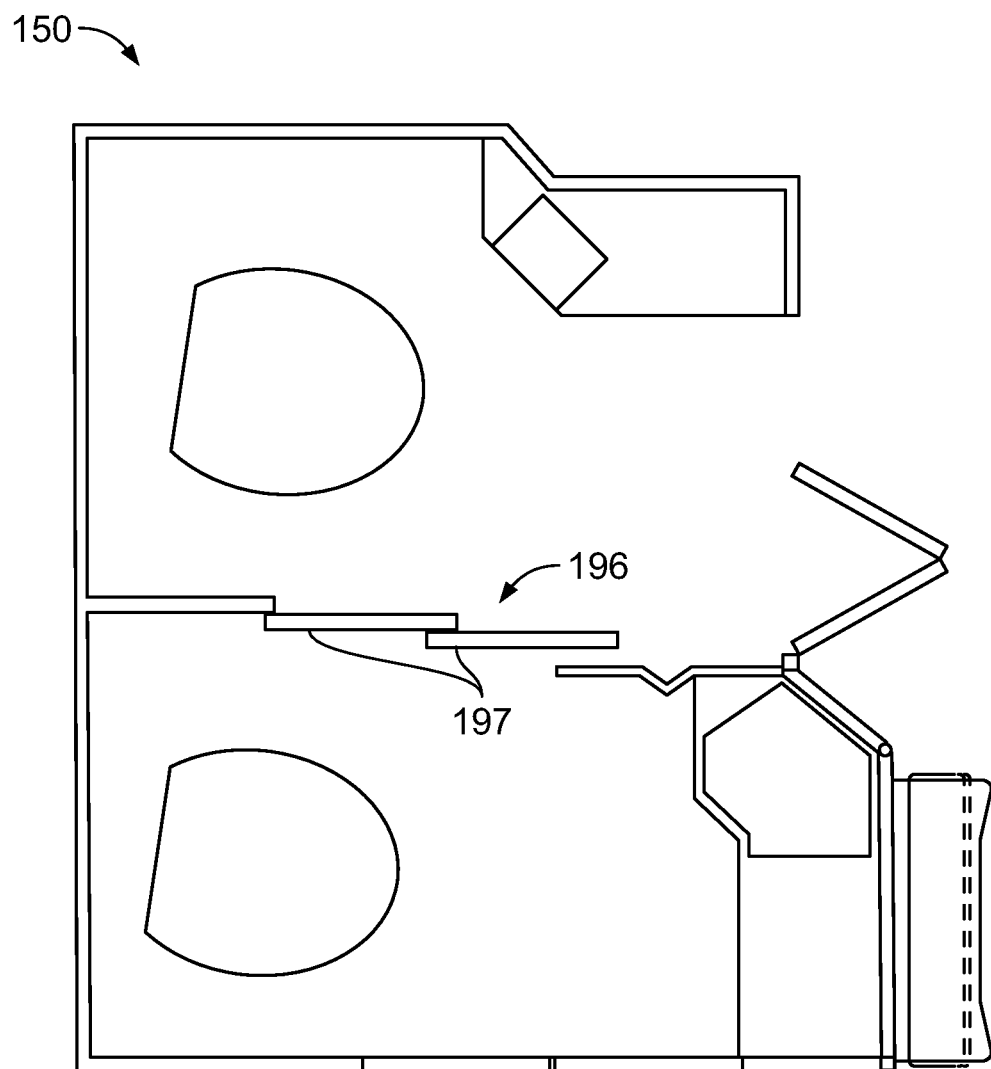
FIG. 19 illustrates a top view of a lavatory system within an internal cabin, according to an embodiment of the present disclosure.

FIG. 19 illustrates a top view of a lavatory system 150 within an internal cabin, according to an embodiment of the present disclosure. In this embodiment, the lavatory system 150 includes divider wall 196 having one or more sliding or telescoping segments 197.

Referring to FIGS. 5-8 and 19, the lavatory system 150 allows for the space of three passenger seats to be occupied by two lavatory units. Traditional lavatories consume approximately 20% to 30% more longitudinal space than a passenger seat, resulting in six to twelve passenger seats displaced for two lavatories to be installed. A traditional lavatory area size ranges between 10.8 to 13.4 square feet. In contrast, the lavatory system 150 as described herein provides two lavatory units, such as within a thirteen square foot area, which may be the same or similar area of a single triple passenger seat assembly (60"×32").

In at least one embodiment, the lavatory system 150 may located at an end of a column of seats proximate to an exit doorway. The second (or outboard) lavatory unit 158 opens to the egress path 170 such as a lateral exit passageway into the preserved space used during by flight attendants during emergency evacuations (the lavatory is not in use during this critical time). The first (or inboard) lavatory unit 156 opens to the aisle 160 or alternatively to the same egress path 170. As an option, the first lavatory unit 156 may extend longitudinally further than the second lavatory unit 158 because the first lavatory unit 156 is inboard of the flight attendant assist space 220.

Figure 9:
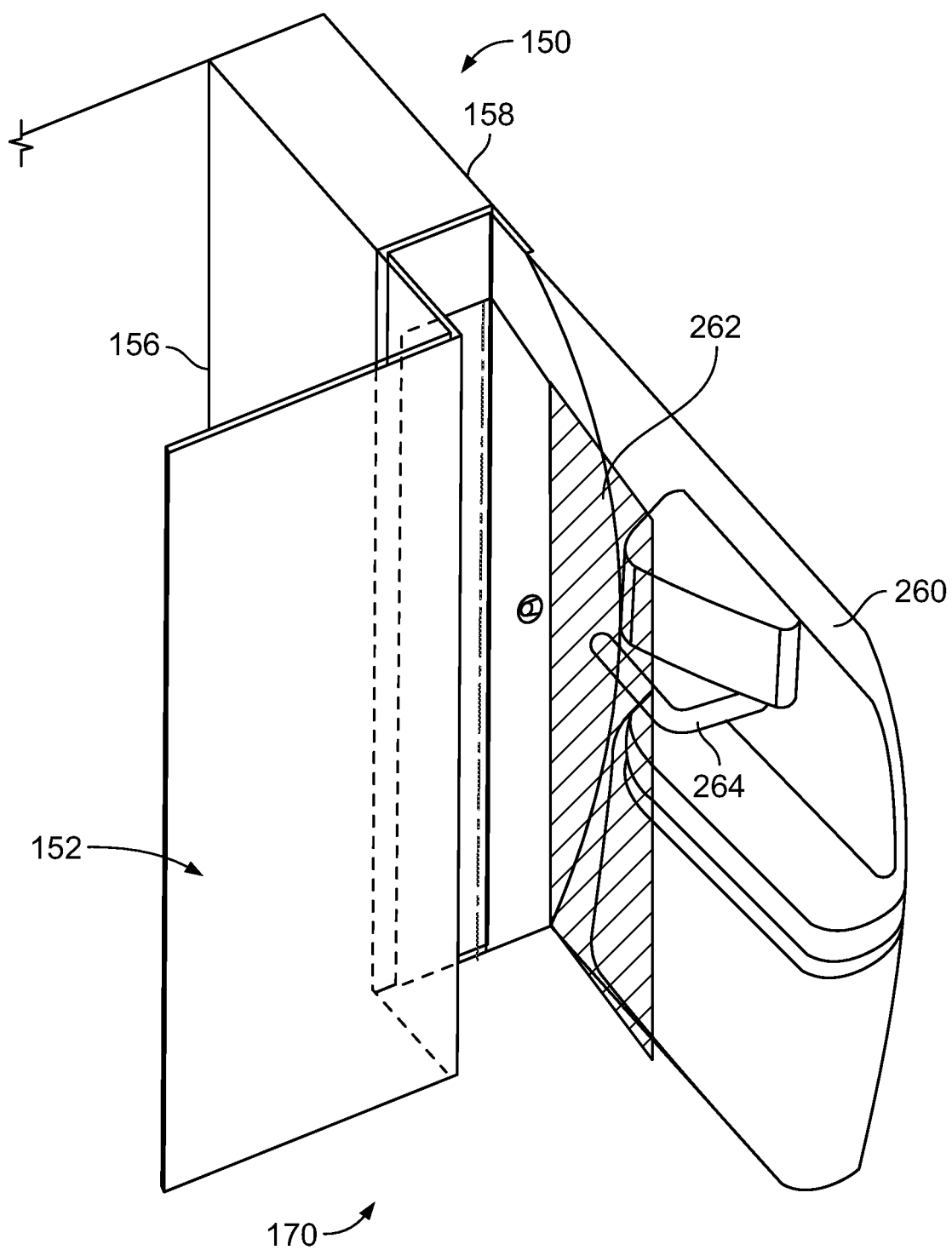
FIG. 9 illustrates a perspective view of a lavatory system proximate to an exit door, according to an embodiment of the present disclosure.

FIG. 9 illustrates a perspective view of the lavatory system 150 proximate to an exit door 260, such as that of an aircraft, according to an embodiment of the present disclosure. The exit door 260 is at an end of the egress path 170. As an option, the lavatory system 150 may include a movable barrier 262 that is movably coupled to the second lavatory unit 158. The barrier 262 can be a panel, wall, screen, door, curtain, or the like that is configured to be moved between an extended position, as shown in FIG. 9, in which the barrier 262 is disposed in front of the exit door 260, and a retracted position, in which the exit door 260 is visible within the internal cabin 152.

The barrier 262 can be movably coupled to the second lavatory unit 158, another portion of the lavatory system 150, or a portion of the internal cabin, such as through hinges, slides and tracks, or the like. For example, the barrier 262 is configured to pivot between the extended position and the retracted position, such as about one or more hinges. As another example, the barrier 262 is configured to slide between the extended position and the retracted position. As another example, the barrier 262 is configured to unfold and fold between the extended position and the retracted position.

As passengers are entering and exiting the internal cabin 152, such as into the egress path 170 through the exit door 260 in the opened position, the barrier 262 is in the retracted position. During a flight, the barrier 262 is moved to the extended position, as shown in FIG. 9. In the extended position, the barrier 262 conceals the exit door 260, or at least a portion thereof (such as a handle 264), which protects the exit door 260 from being touched, and may assure certain individuals that there is no risk of the handle 264 being inadvertently grasped.

Figure 10:
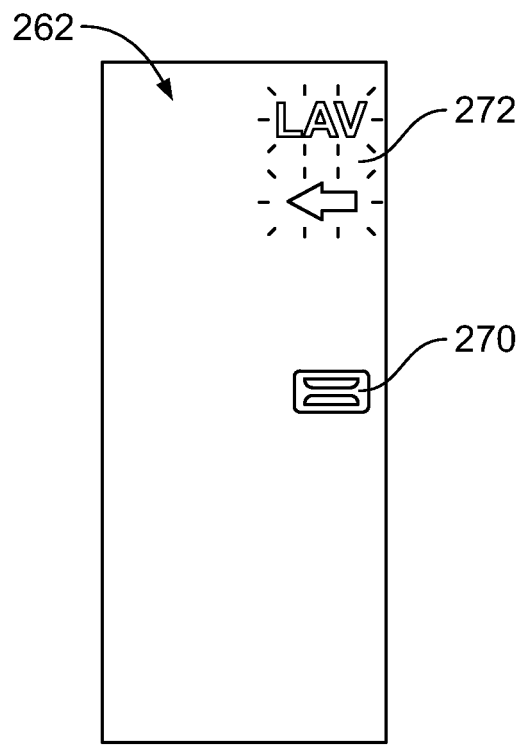
FIG. 10 illustrates a front view of a barrier in an extended position, according to an embodiment of the present disclosure.

FIG. 10 illustrates a front view of the barrier 262 in the extended position, according to an embodiment of the present disclosure. The barrier 262 can include a handle 270, which may be grasped to move the barrier 262 between the extended and retracted positions. The barrier 262 can also include a sign 272 that indicates a location of the second lavatory unit 158 (shown in FIG. 9), particularly because the door of the second lavatory unit 158 may be hidden from the view by an extended portion of the first lavatory unit 156. The sign 272 can be painted or printed on the barrier 262. As another example, the sign 272 can be a decal. As another example, the sign 272 can be a plate or panel mounted on the barrier 262. As another example, the sign 272 can be illuminated, such as through one or more light assemblies.

The barrier 262 may be used with any of the lavatory systems 150 described herein. Optionally, the lavatory systems 150 may not include the barrier 262.

Figure 11:
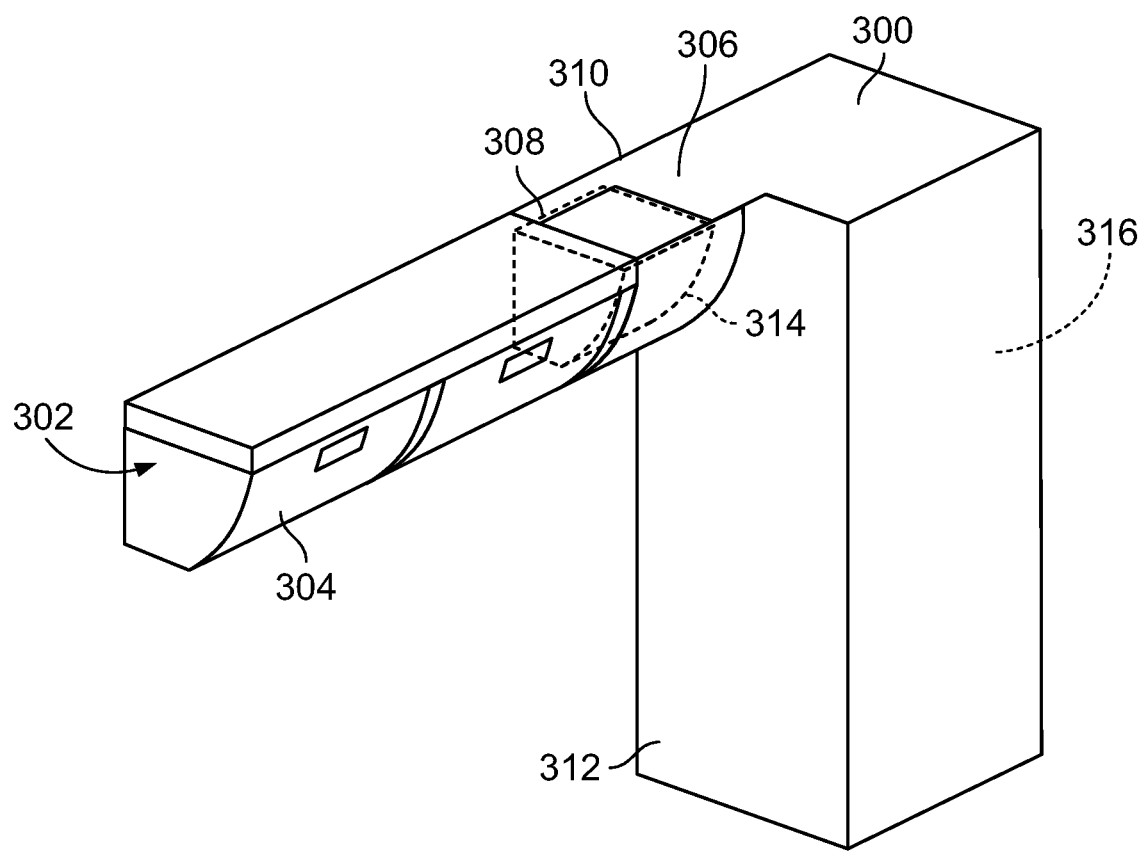
FIG. 11 illustrates a perspective view of a lavatory connected to a row of overhead stowage bin assemblies, according to an embodiment of the present disclosure.

FIG. 11 illustrates a perspective view of a lavatory 300 connected to a row 302 of overhead stowage bin assemblies 304 (such as the stowage bin assemblies 118 shown in FIG. 3), according to an embodiment of the present disclosure. The lavatory 300 may be the lavatory systems 150, as described herein. For example, the lavatory 300 may be the second lavatory unit 156, as shown in FIGS. 5-9. As another example, the lavatory 300 may be a single unit lavatory, whether or not part of the lavatory system 150 described herein.

A portion of the row 302 directly connects to the lavatory 300, such as a fore or aft end of the lavatory 300. For example, a stowage bin assembly 304 may directly connect to the lavatory 300, such as at an upper portion 306 of the lavatory 300. As another example, an end cap 308 of the row 302 connects a stowage bin assembly 304 to the lavatory 300.

The end cap 308 and/or a stowage bin assembly 304 provides a storage compartment 310 that extends outwardly from an outer wall 312 of the lavatory 300, such as at an upper overhead portion that is aligned with the stowage bin assemblies 304. The storage compartment 310 defines an internal storage space 314 that connects to an interior chamber 316 of the lavatory 300. One or more outer walls (including the outer wall 312) defines the interior chamber 316. The storage compartment 310 extends outwardly from one or more of the outer walls. That is, the storage compartment 310 is not within the interior chamber 316. In this manner, the storage compartment 310 may replace one or more cabinets that would otherwise be within the lavatory 300, thereby freeing up additional space within the lavatory 300.

A movable compartment or storage access door may be disposed between the storage compartment 310 and the interior chamber 316 of the lavatory 300. The storage access door is movable between an open position, in which the internal storage space 314 is opened to the interior chamber 316, and a closed position, in which the internal storage space is closed to the interior chamber 316. Various supplies, such as toilet papers, facial tissue, and the like, may be stored within the internal storage space 314, instead of within the interior chamber 316 of the lavatory 300.

As shown, the storage compartment 310 directly connects to the interior chamber 316 of the lavatory 300, but is not within the interior chamber 316. Instead, the storage compartment 310 may be part of the end cap 308 and/or a stowage bin assembly 304 outside of the interior chamber 316 of the lavatory 300. The internal storage space 314 of the storage compartment 310 is accessible from within the interior chamber 316 of the lavatory 300. By recessing cabinet space into the end cap 308 and/or an overhead stowage bin assembly 304, more space (which may otherwise be occupied by one or more cabinets) is created within the interior chamber 316. In general, the storage compartment 310 coupled to the lavatory 300 reduces a need for cabinet space within the lavatory 300.

Figure 12:
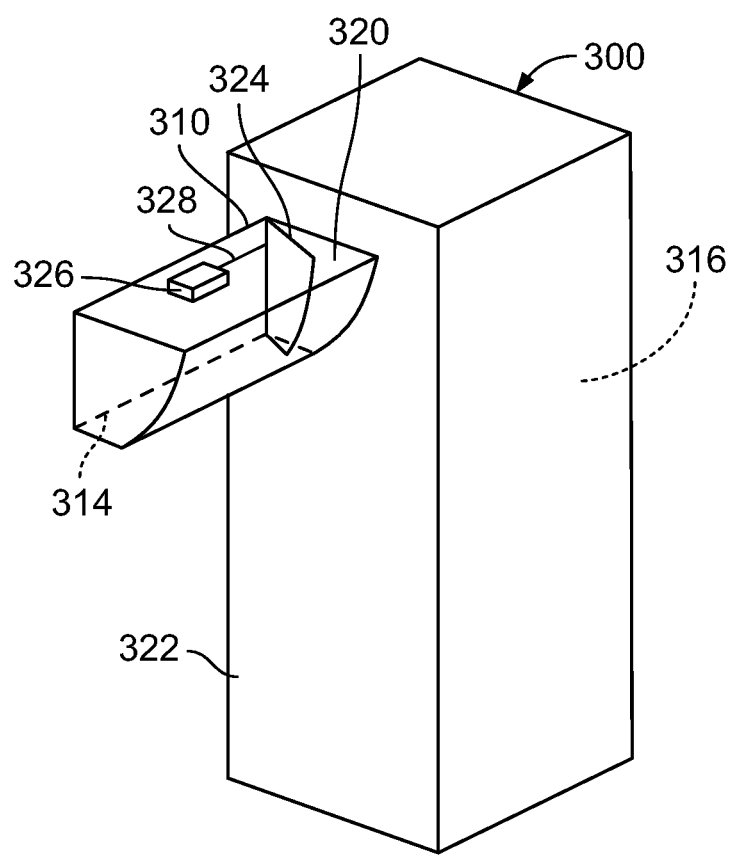
FIG. 12 illustrates a perspective view of a storage compartment extending outwardly from the lavatory, according to an embodiment of the present disclosure.

FIG. 12 illustrates a perspective view of the storage compartment 310 extending outwardly from the lavatory 300, according to an embodiment of the present disclosure. As noted, the storage compartment 310 may be at least part of an end cap coupled to a stowage bin assembly, or optionally at least part of a stowage bin assembly. An access opening 320 connects the internal storage space 314 of the storage compartment 310 to the interior chamber 316 of the lavatory 300. The access opening 320 may be formed through a wall 322 of the lavatory 300, such as a fore or aft wall.

A storage access door 324 is movably coupled to the storage compartment 310 and/or the wall 322. The storage access door 324 is movable between an open position and a closed position. The storage access door 324 may pivot about one or more hinges, slides over one or more tracks, and/or the like between the open position and the closed position.

In at least one embodiment, a lighting assembly 326 may be disposed within the storage compartment 310. The lighting assembly 326 is configured to illuminate the interior storage space 314. In at least one embodiment, the lighting assembly 326 is operatively coupled to the storage access door 324, such as through a switch 328, for example. In this manner, the lighting assembly 326 may be activated to illuminate the interior storage space 314 when the storage access door 324 is opened, and deactivated when the storage access door 324 is closed.

The storage compartment 310 may be used with any of the embodiments described herein. For example, the storage compartment 310 may be connected to any of the lavatories or lavatory units described herein.

Figure 13:
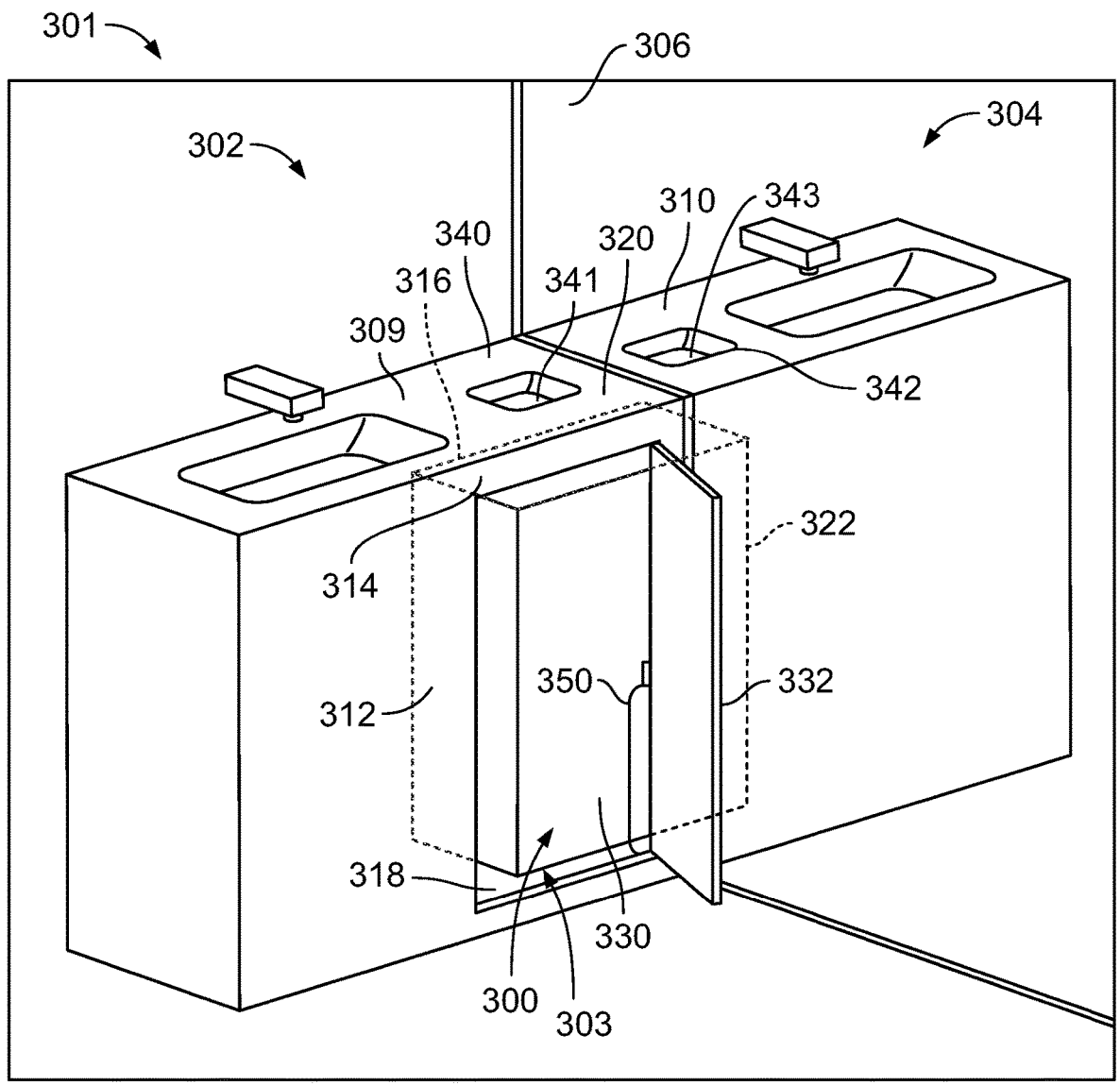
FIG. 13 illustrates a perspective internal view of a containment compartment for a first lavatory connected to a second lavatory, according to an embodiment of the present disclosure.

FIG. 13 illustrates a perspective internal view of a containment compartment 300 for a first lavatory 302 connected to a second lavatory 304, according to an embodiment of the present disclosure. A lavatory system 301 includes the first lavatory 302, the second lavatory 304, and the containment compartment 300 that is common to (for example, shared by) the first lavatory 302 and the second lavatory 304. The containment compartment 300 defines a containment chamber 303. In at least one embodiment, the first lavatory 302 is the first lavatory unit 156, and the second lavatory 304 is the second lavatory 158, as shown and described with respect to FIGS. 5-9, for example. Optionally, the first lavatory 302 and the second lavatory 304 may be other than the first lavatory 156 and the second lavatory unit 304.

The first lavatory 302 is separated from the second lavatory 304 by a divider wall 306. For example, the divider wall 306 may be the divider wall 196, as shown and described with respect to FIGS. 5-9.

The first lavatory 302 includes a first housing 308 (such as a first cabinet) and the second lavatory 310 includes a second housing 310 (such as a second cabinet). The containment compartment 300 is common to both the first lavatory 302 and the second lavatory 310. The containment compartment 300 extends through the divider wall 196.

The containment compartment 300 includes a first interior end wall 312 that connects to a front wall 314, a rear wall 316, a base 318, and an upper counter 320 that extend between (and/or form portions of) the first housing 308 and the second housing 310. The front wall 314, the rear wall, the base 318, and the upper counter 320 connect to a second interior end wall 322 opposite from the first interior end wall 312. The first interior end wall 312 is within the first lavatory 302, and the second interior end wall 322 is within the second lavatory 304. The first interior end wall 312 may be part of the first housing 308, such as a first cabinet, and the second interior end wall 322 may be part of the second housing 310, such as a second cabinet.

The first interior end wall 312, the front wall 314, the rear wall 316, the base 318, the upper counter 320 (which extends through the divider wall 306), and the second interior end wall 322 define the containment chamber 303 of the containment compartment 300. The containment compartment 300 is common to the first lavatory 302 and the second lavatory 304. The containment compartment 300 is shared by both the first lavatory 302 and the second lavatory 304.

A trash container 330 is configured to be stored within the containment compartment 300. An access door 332 is coupled to the front wall 314, such as within the first lavatory 302. For example, the access door 332 is movably coupled to the front wall 312 within first lavatory 302 (or optionally the second lavatory 304). The access door 302 is movably coupled to the front wall 314, such as through one or more hinges, slides and tracks, and/or the like. As such, the access door 302 is configured to pivotally or slidably move between an open position, in which the containment chamber 303 of the containment compartment 300 is exposed, and a closed position, in which the containment chamber 303 of the containment compartment 300 is closed. When the access door 302 is in the open position, the trash container 330 may be selectively removed and repositioned.

A first trash opening 340 having a movable lid 341 is formed in the upper counter 320 within the first lavatory 302. A second trash opening 342 having a movable lid 343 is formed in the upper counter 320 within the second lavatory 302. The first trash opening 340 and the second trash opening 342 both lead to the containment chamber 303 of the containment compartment 300, which is common to both the first lavatory 302 and the second lavatory 304. In this manner, trash disposed within both the first lavatory 302 and the second lavatory 304 may be discarded through the respective first trash opening 340 and the second trash opening 320 into the trash container 330, which is disposed within the containment chamber 303 of the containment compartment 300.

In at least one embodiment, the containment compartment 300 may be configured to contain a fire therein. For example, interior wall portions that define the containment compartment 300 may be formed of fire retardant materials, and joints between the walls and the access door 332 in the closed position may sealingly engage one another to limit a flow of oxygen into the containment compartment 300 when the access door 332 is closed. Further, the containment compartment 300 may retain a fire suppression device 350, such as a fire extinguisher, that is shared by the first lavatory 302 and the second lavatory 304.

The containment compartment 300 retains the trash container 330, which is used by both the first lavatory 302 and the second lavatory 304, thereby economizing space for both the first lavatory 302 and the second lavatory 304. In this manner, additional space is provided for both the neighboring first lavatory 302 and the second lavatory 304. The containment compartment 300 provides access to the single trash container 330 from separate, but neighboring lavatories 302 and 304, which are separated by the divider wall 306.

The containment compartment 300 may be used with any of the embodiments described herein. For example, the containment compartment 300 may be used with respect to any neighboring lavatories or lavatory units, as described herein.

Figure 14:
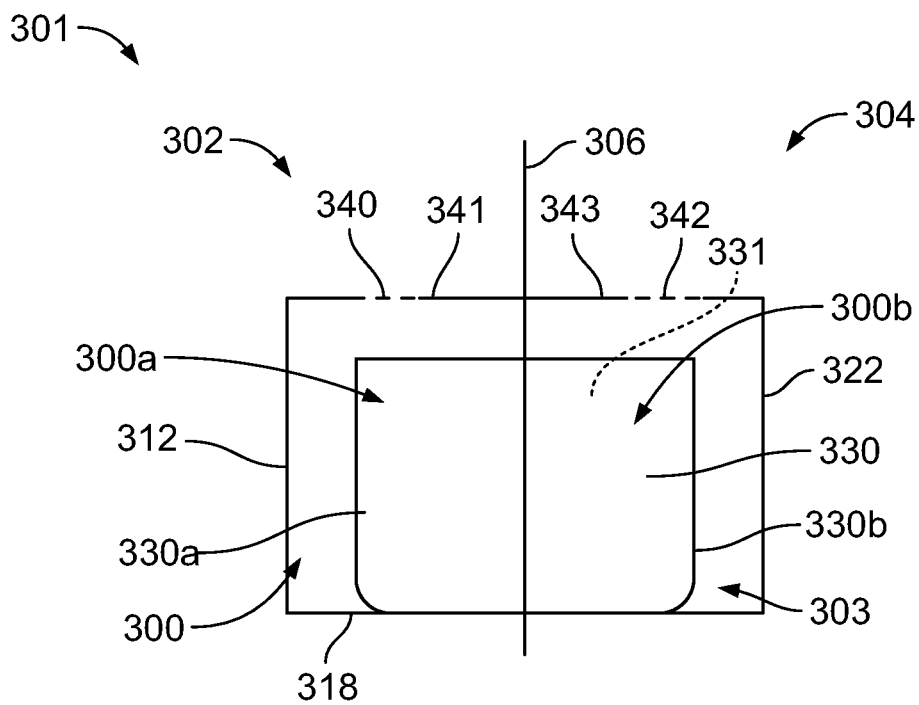
FIG. 14 illustrates a simplified front view of the containment compartment common to the first lavatory and the second lavatory, according to an embodiment of the present disclosure.

FIG. 14 illustrates a simplified front view of the containment compartment 300 common to the first lavatory 302 and the second lavatory 302, according to an embodiment of the present disclosure. The containment compartment 300 extends through the divider wall 306 so that a first portion 300a of the containment compartment 300a is within the first lavatory 302, and a second portion 300b of the containment compartment 300b is within the second lavatory 302.

In at least one embodiment, a first container portion 330a of the trash container 330 is underneath the first trash opening 340, and a second container portion 330b of the trash container 330 is underneath the second trash opening 342. As such, trash passed into and through the first trash opening 340 and the second trash opening 342 is received within a containing chamber 331 of the trash container 330.

Figure 15:
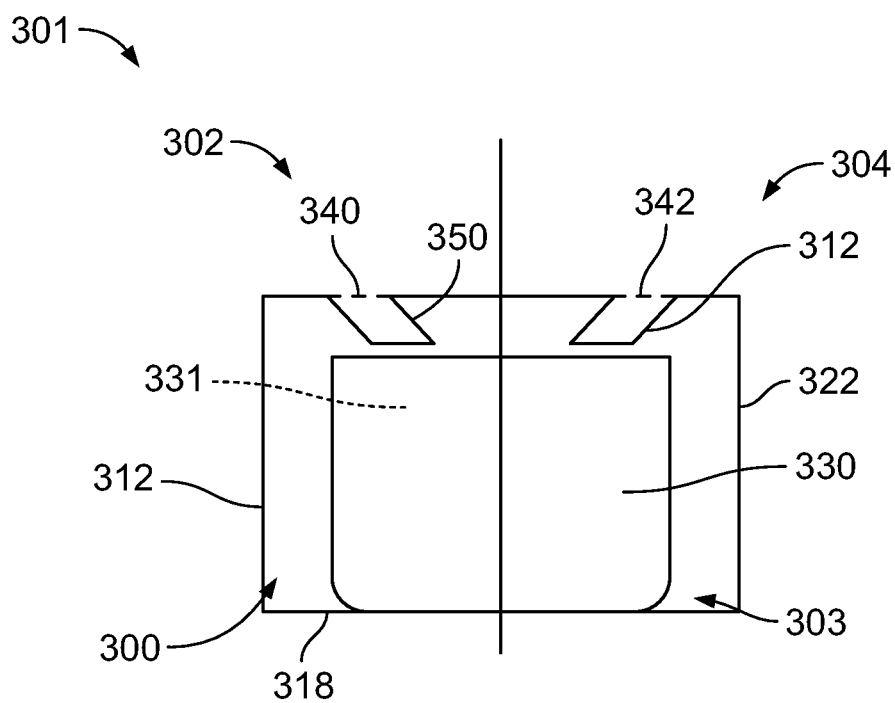
FIG. 15 illustrates a simplified front view of the containment compartment common to the first lavatory and the second lavatory, according to an embodiment of the present disclosure.

FIG. 15 illustrates a simplified front view of the containment compartment 300 common to the first lavatory 302 and the second lavatory 304, according to an embodiment of the present disclosure. The trash container 330 may not be positioned directly below the first trash opening 340 and/or the second trash opening 342. As such, a first trash duct 350 may be connected to the first trash opening 340, and a second trash duct 352 may be connected to the second trash opening 342. The first trash duct 350 and the second trash duct 352 lead to containing chamber 331 of the trash container 330.

Figure 16:
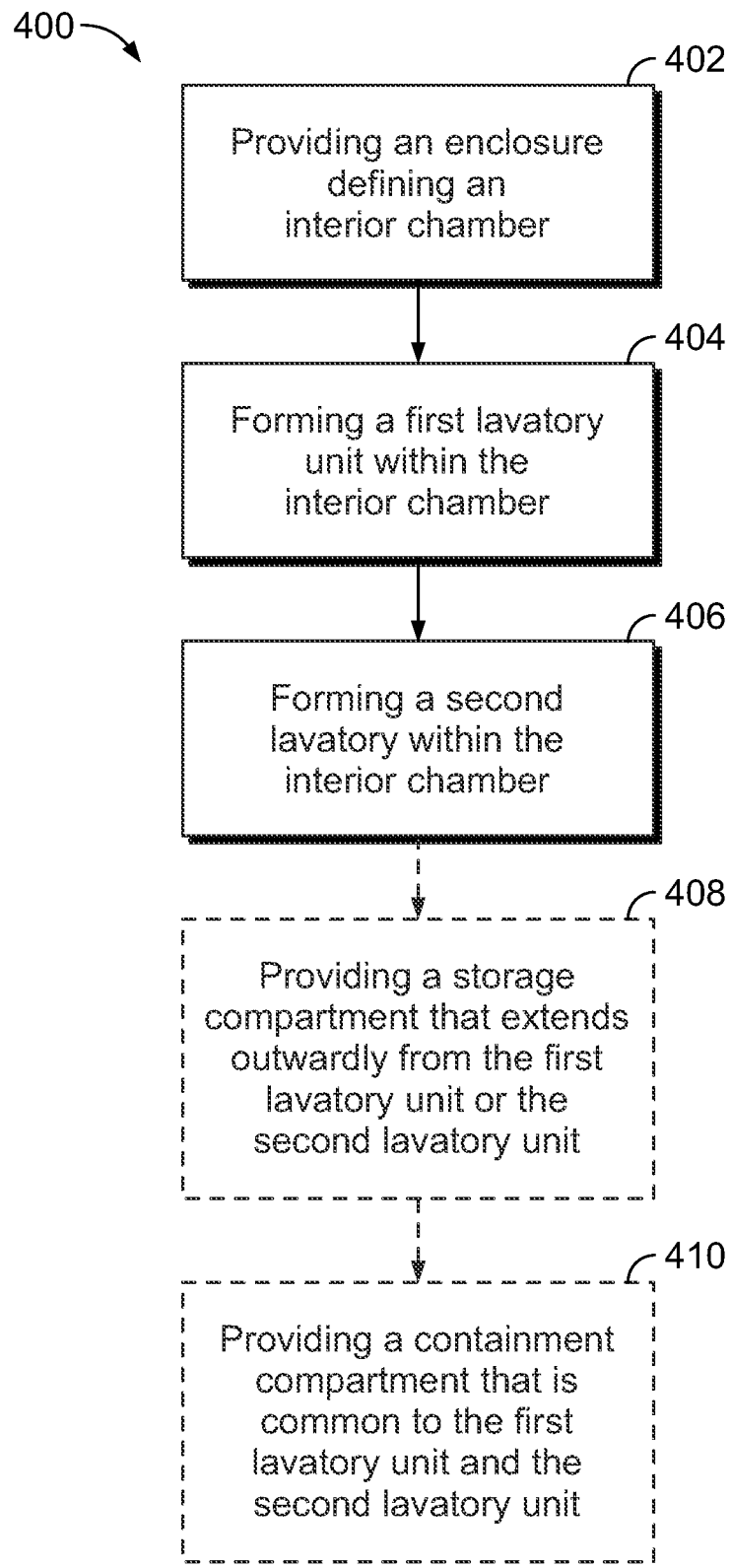
FIG. 16 illustrates a flow chart of a method of forming a lavatory system within an internal cabin of a vehicle, according to an embodiment of the present disclosure.

FIG. 16 illustrates a flow chart of a method 400 of forming a lavatory system within an internal cabin of a vehicle. The method 400 includes providing, at 402, an enclosure defining an interior chamber; forming, at 404, a first lavatory unit within the interior chamber, and forming, at 406, a second lavatory within the interior chamber. The first lavatory unit is adjacent to the second lavatory unit.

In at least one example, said forming 406 the second lavatory includes providing a portion of an outboard wall of the internal cabin as an outboard wall of the second lavatory.

In at least one example, said forming 404 the first lavatory unit includes connecting a first passage of the first lavatory unit to an aisle of the internal cabin, and said forming 406 the second lavatory unit includes connecting a second passage of the second lavatory unit to an egress path of the internal cabin.

In at least one embodiment, the method includes providing a divider wall within the interior chamber, and separating the first lavatory unit from the second lavatory unit with the divider wall. As a further example, the method may include moving the divider wall between a closed position that separates the interior chamber into the first lavatory unit and the second lavatory unit, and an open position, in which the interior chamber provides an enlarged, expanded single lavatory space.

As another example, the method includes movably coupling a barrier to one of the first lavatory unit or the second lavatory unit, and moving the barrier is between an extended position and a retracted position. The barrier in the extended position is disposed in front of an exit door of the vehicle. The exit door is visible within the internal cabin when the barrier is in the retracted position.

Optionally, the method includes providing, at 408, a storage compartment that extends outwardly from an outer wall of one or both of the first lavatory unit or the second lavatory unit. The storage compartment defines an internal storage space that connects to the interior chamber. As another option, the method includes 408 in relation to lavatory system, a lavatory, or lavatory unit, and not steps 402-406.

Optionally, the method includes providing, at 410, a containment compartment that is common to the first lavatory unit and the second lavatory unit. As another option, the method includes 410 in relation to a lavatory system, a lavatory, or lavatory unit, and not steps 402-408. As another option, the method includes steps 408 and 410, but not steps 402-406.

Figure 17:
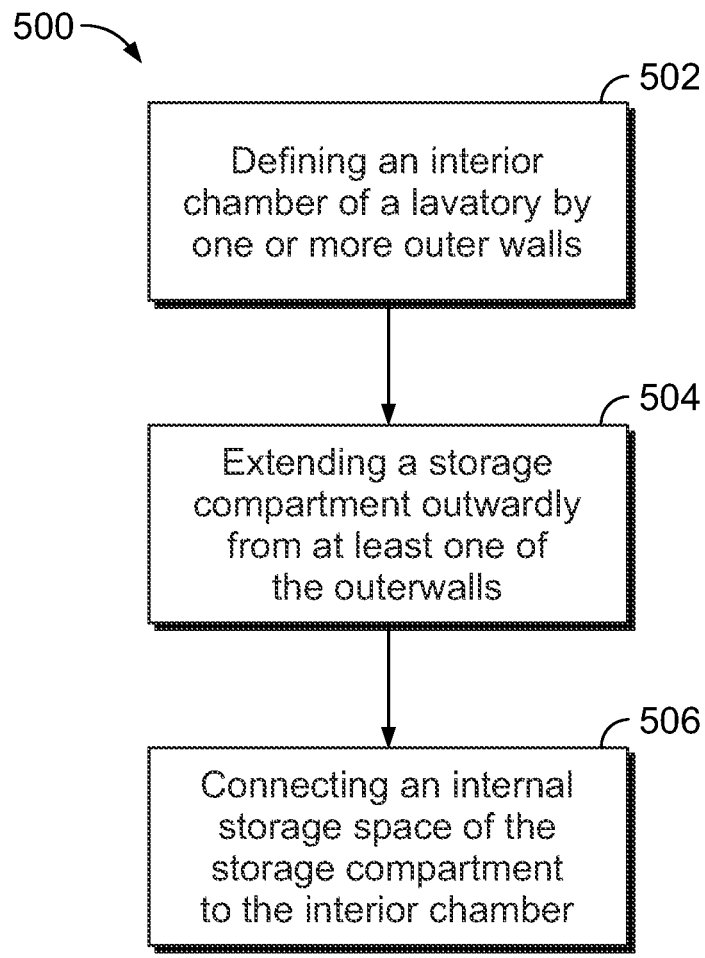
FIG. 17 illustrates a flow chart of a method of forming a lavatory within an internal cabin of a vehicle, according to an embodiment of the present disclosure.

FIG. 17 illustrates a flow chart of a method 500 of forming a lavatory within an internal cabin of a vehicle. The method 500 includes defining, at 502, an interior chamber of the lavatory by one or more outer walls; extending, at 504, a storage compartment outwardly from at least one of the outer walls; and connecting, at 506, an internal storage space of the storage compartment to the interior chamber.

In at least one example, the method includes forming at least a portion of a stowage bin assembly as the storage compartment. As another example, the method includes forming at least a portion of an end cap connected to a stowage bin assembly as the storage compartment.

In at least one embodiment, the method includes disposing a storage access door disposed between the storage compartment and the interior chamber; and moving the storage access door moved between an open position and a closed position. The internal storage space is opened to the interior chamber when the storage access door is in the open position. The internal storage space is closed to the interior chamber when the storage access door is in the closed position.

In at least one embodiment, said extending includes directly connecting the storage compartment to the interior chamber. The storage compartment is not within the interior chamber.

As an example, the method includes forming an access opening through the one or more outer walls, and connecting the internal storage space to the interior chamber through the access opening.

In at least one embodiment, the method includes providing a lighting assembly within the internal storage space of the storage compartment. As a further example, the method includes operatively coupling the lighting assembly to a storage access door of the storage compartment; activating the lighting assembly to illuminate the interior storage space when the storage access door is opened; and deactivating the lighting assembly when the storage access door is closed.

Figure 18:
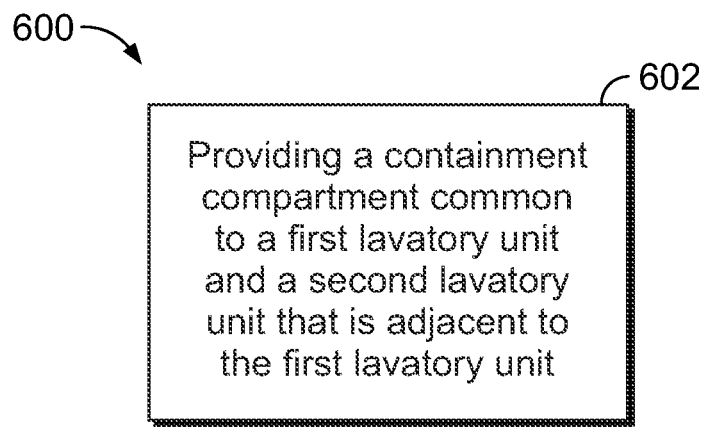
FIG. 18 illustrates a block diagram of a method of forming a lavatory within an internal cabin of a vehicle, according to an embodiment of the present disclosure.

FIG. 18 illustrates a block diagram of a method 600 of forming a lavatory system within an internal cabin of a vehicle. The method 600 includes providing, at 602, a containment compartment common to a first lavatory unit and a second lavatory unit that is adjacent to the first lavatory unit.

In at least one example, the method includes extending the containment compartment through a divider wall that separates the first lavatory unit from the second lavatory unit.

In at least one embodiment, the containment compartment includes a first interior end wall within the first lavatory unit, a front wall, a rear wall, a base, an upper counter, and a second interior end wall opposite from the first interior end wall. The second interior end wall is within the second lavatory unit. The first interior end wall, the front wall, the rear wall, the base, the upper counter, and the second interior end wall define a containment chamber of the containment compartment.

In at least one embodiment, the method includes storing a trash container within the containment compartment.

As another example, the method includes providing an access door within one of the first lavatory unit or the second lavatory unit; and moving the access door between an open position and a closed position. The containment compartment is exposed when the access door is in the open position. The containment compartment is closed when the access door is in the closed position.

In at least one embodiment, the method includes forming a first trash opening in the first lavatory unit. The first trash opening leads to a containment chamber of the containment compartment. The method also includes forming a second trash opening in the second lavatory unit. The second trash opening leads to the containment chamber of the containment compartment. As a further example, the method includes connecting a first trash duct to the first trash opening, and connecting a second trash duct to the second trash opening.

As an example, the method includes containing the first lavatory unit and the second lavatory unit within a single monument within the internal cabin.

As an example, the method includes disposing the first lavatory unit and the second lavatory unit side-to-side across a portion of the internal cabin.

Referring to FIGS. 1-18, as described herein, embodiments of the present disclosure provide lavatory units that occupy less space than known lavatories within an internal cabin of a vehicle. Further, embodiments of the present disclosure provide lavatory units that are readily and easily accessible by persons of limited mobility. Also, embodiments of the present disclosure provide multi-unit lavatory systems that do not reduce space for additional seating within an internal cabin of a vehicle.

While various spatial and directional terms, such as top, bottom, lower, mid, lateral, horizontal, vertical, front and the like can be used to describe embodiments of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) can be used in combination with each other. In addition, many modifications can be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A lavatory system within an internal cabin of a vehicle, the lavatory system comprising:
a first lavatory unit comprising a first toilet;
a second lavatory unit adjacent to the first lavatory unit, wherein the second lavatory unit comprises a second toilet; and
a containment compartment common to the first lavatory unit and the second lavatory unit, wherein the containment compartment comprises:
a first interior end wall within the first lavatory unit;
a front wall;
a rear wall;
a base;
an upper counter;
a second interior end wall opposite from the first interior end wall, wherein the second interior end wall is within the second lavatory unit, wherein the first interior end wall, the front wall, the rear wall, the base, the upper counter, and the second interior end wall define a containment chamber of the containment compartment; and
an access door within one of the first lavatory unit or the second lavatory unit, wherein the access door extends substantially along an entire height of the front wall, wherein the access door is moveable between an open position and a closed position, wherein the containment compartment is exposed when the access door is in the open position, and wherein the containment compartment is closed when the access door is in the closed position.

2. The lavatory system of claim 1, wherein the containment compartment extends through a divider wall that separates the first lavatory unit from the second lavatory unit.

3. The lavatory system of claim 1, further comprising a trash container stored within the containment compartment.

4. The lavatory system of claim 1, further comprising:
a first trash opening in the first lavatory unit, wherein the first trash opening leads to a containment chamber of the containment compartment; and
a second trash opening in the second lavatory unit, wherein the second trash opening leads to the containment chamber of the containment compartment.

5. The lavatory system of claim 4, further comprising:
a first trash duct connected to the first trash opening; and
a second trash duct connected to the second trash opening.

6. The lavatory system of claim 1, wherein the first lavatory unit and the second lavatory unit are contained within a single monument within the internal cabin.

7. The lavatory system of claim 1, wherein the first lavatory unit and the second lavatory unit are side-to-side across a portion of the internal cabin.

8. The lavatory system of claim 1, wherein the first lavatory unit further comprises a first sink, and wherein the second lavatory unit further comprises a second sink.

9. A method of forming a lavatory system within an internal cabin of a vehicle, the method comprising:
providing a containment compartment common to a first lavatory unit and a second lavatory unit that is adjacent to the first lavatory unit, wherein the first lavatory unit comprises a first toilet, and wherein the second lavatory unit comprises a second toilet,
wherein the containment compartment comprises:
a first interior end wall within the first lavatory unit;
a front wall;
a rear wall;
a base;
an upper counter;
a second interior end wall opposite from the first interior end wall, wherein the second interior end wall is within the second lavatory unit, wherein the first interior end wall, the front wall, the rear wall, the base, the upper counter, and the second interior end wall define a containment chamber of the containment compartment; and an access door within one of the first lavatory unit or the second lavatory unit, wherein the access door extends substantially along an entire height of the front wall, wherein the access door is moveable between an open position and a closed position, wherein the containment compartment is exposed when the access door is in the open position, and wherein the containment compartment is closed when the access door is in the closed position.

10. The method of claim 9, further comprising extending the containment compartment through a divider wall that separates the first lavatory unit from the second lavatory unit.

11. The method of claim 9, further comprising storing a trash container within the containment compartment.

12. The method of claim 9, further comprising:
forming a first trash opening in the first lavatory unit, wherein the first trash opening leads to a containment chamber of the containment compartment; and
forming a second trash opening in the second lavatory unit, wherein the second trash opening leads to the containment chamber of the containment compartment.

13. The method of claim 12, further comprising:
connecting a first trash duct to the first trash opening; and
connecting a second trash duct to the second trash opening.

14. The method of claim 9, further comprising containing the first lavatory unit and the second lavatory unit within a single monument within the internal cabin.

15. The method of claim 9, further comprising disposing the first lavatory unit and the second lavatory unit side-to-side across a portion of the internal cabin.

16. A vehicle comprising:
an internal cabin; and
a lavatory system within the internal cabin, the lavatory system comprising:
a first lavatory unit comprising a first toilet and a first sink;
a second lavatory adjacent to the first lavatory unit, wherein the second lavatory comprises a second toilet and a second sink;
a divider wall separating the first lavatory unit from the second lavatory unit;
a containment compartment common to the first lavatory unit and the second lavatory unit, wherein the containment compartment extends through the divider wall, wherein the containment compartment comprises:
a first interior end wall within the first lavatory unit;
a front wall;
a rear wall;
a base;
an upper counter;
a second interior end wall opposite from the first interior end wall, wherein the second interior end wall is within the second lavatory unit, wherein the first interior end wall, the front wall, the rear wall, the base, the upper counter, and the second interior end wall define a containment chamber of the containment compartment; and
an access door within one of the first lavatory unit or the second lavatory unit, wherein the access door extends substantially along an entire height of the front wall, wherein the access door is moveable between an open position and a closed position, wherein the containment compartment is exposed when the access door is in the open position, and wherein the containment compartment is closed when the access door is in the closed position;
a first trash opening in the first lavatory unit, wherein the first trash opening leads to a containment chamber of the containment compartment;
a second trash opening in the second lavatory unit, wherein the second trash opening leads to the containment chamber of the containment compartment; and
a trash container stored within the containment compartment.

17. The lavatory system of claim 3, wherein the trash container is selectively removable and repositionable when the access door is in the open position.

18. The method of claim 11, wherein the trash container is selectively removable and repositionable when the access door is in the open position.

19. The vehicle of claim 16, wherein the trash container is selectively removable and repositionable when the access door is in the open position.

* * * * *